(12) United States Patent  
Travis

(10) Patent No.: US 8,887,497 B2
(45) Date of Patent: Nov. 18, 2014

(54) APPARATUS UTILIZING BUOYANCY FORCES AND METHOD FOR USING SAME

(76) Inventor: Wayne S. Travis, Chickasha, OK (US)

( * ) Notice: Subject to any disclaimer, the term of this patent is extended or adjusted under 35 U.S.C. 154(b) by 575 days.

(21) Appl. No.: 13/292,954

(22) Filed: Nov. 9, 2011

(65) Prior Publication Data

US 2012/0117957 A1 May 17, 2012

Related U.S. Application Data

(60) Provisional application No. 61/411,772, filed on Nov. 9, 2010.

(51) Int. Cl.
*F03B 17/02* (2006.01)
*F15B 3/00* (2006.01)
*F15B 15/16* (2006.01)

(52) U.S. Cl.
CPC ............... *F15B 15/16* (2013.01); *Y02E 60/17* (2013.01); *F15B 3/00* (2013.01)
USPC ................................ 60/398; 60/495

(58) Field of Classification Search
CPC ............ F03B 17/02; F15B 3/00; F15B 15/16; Y02E 60/17
USPC .................... 60/398, 413, 495, 497
See application file for complete search history.

(56) References Cited

U.S. PATENT DOCUMENTS

| 685,269 | A | * | 10/1901 | Fulton | 60/698 |
|---|---|---|---|---|---|
| 891,208 | A | * | 6/1908 | Craig | 92/83 |
| 2,470,312 | A | | 5/1949 | Levin | |
| 2,537,143 | A | | 1/1951 | Levin | |
| 3,961,479 | A | | 6/1976 | Anderson | |
| 4,324,099 | A | * | 4/1982 | Palomer | 60/497 |
| 4,674,281 | A | | 6/1987 | Kim et al. | |
| 4,726,188 | A | | 2/1988 | Woolfolk | |
| 4,838,025 | A | * | 6/1989 | Nelis | 60/505 |
| 4,852,464 | A | * | 8/1989 | Bartmann et al. | 92/53 |
| 6,305,165 | B1 | | 10/2001 | Mizuki, Sr. | |
| 6,803,670 | B2 | | 10/2004 | Peloquin | |
| 7,258,532 | B2 | | 8/2007 | Welch, Jr. et al. | |
| 7,331,174 | B2 | * | 2/2008 | Welch et al. | 60/398 |
| 7,493,759 | B2 | | 2/2009 | Bernitsas et al. | |
| 7,511,386 | B2 | | 3/2009 | Lin | |
| 2007/0284883 | A1 | | 12/2007 | Cafariello | |

FOREIGN PATENT DOCUMENTS

JP 2003/314435 11/2003

OTHER PUBLICATIONS

International Search Report and Written Opinion (PCT/US2011/060036); Nov. 9, 2011.

* cited by examiner

*Primary Examiner* — Thomas E Lazo
(74) *Attorney, Agent, or Firm* — Dunlap Codding, P.C.

(57) ABSTRACT

An apparatus has a tank with an open top, a tank wall, and a closed bottom. A first ringwall extends from the bottom such that a first annular space is defined by the first ringwall and the tank wall, and a second annular space is defined by the first ringwall. A second ringwall extends in the second annular space, and defines a third annular space between the first ringwall and the second ringwall, and a cylindrical space. An air conduit extends through the cylindrical space. A pod disposed into the cylindrical space has a closed chamber and a displacement chamber. An inner riser disposed in the third annular space has an open bottom, and rests onto the inner ringwall. An outer riser rests onto the outer ringwall and is disposed in the first annular space and has a closed top, a wall, and an open bottom.

6 Claims, 20 Drawing Sheets

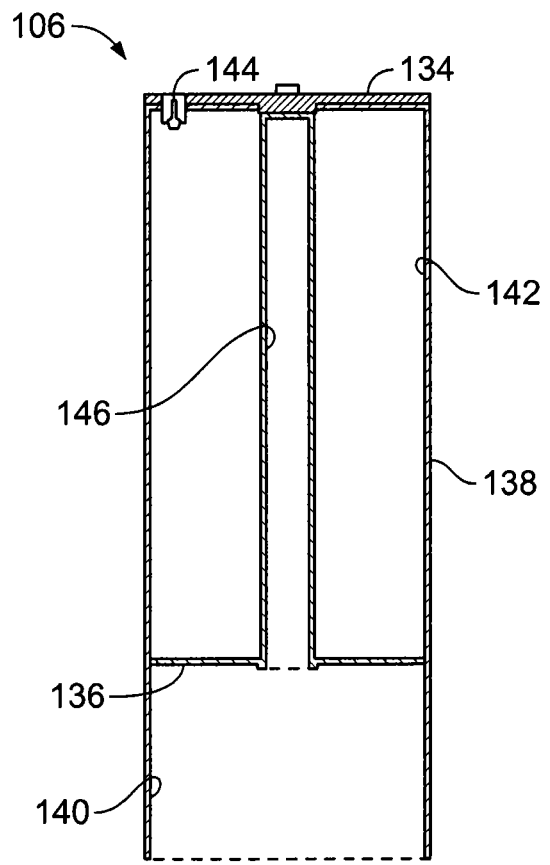
FIG. 4A
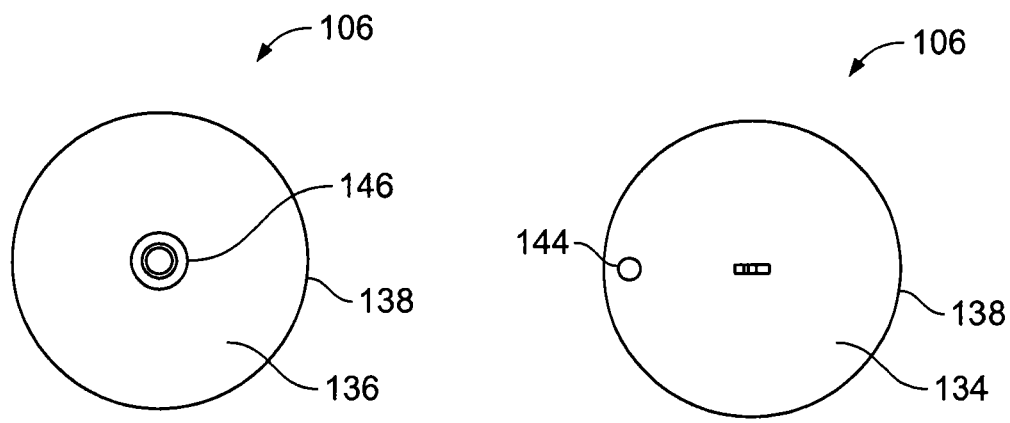
FIG. 4B     FIG. 4C

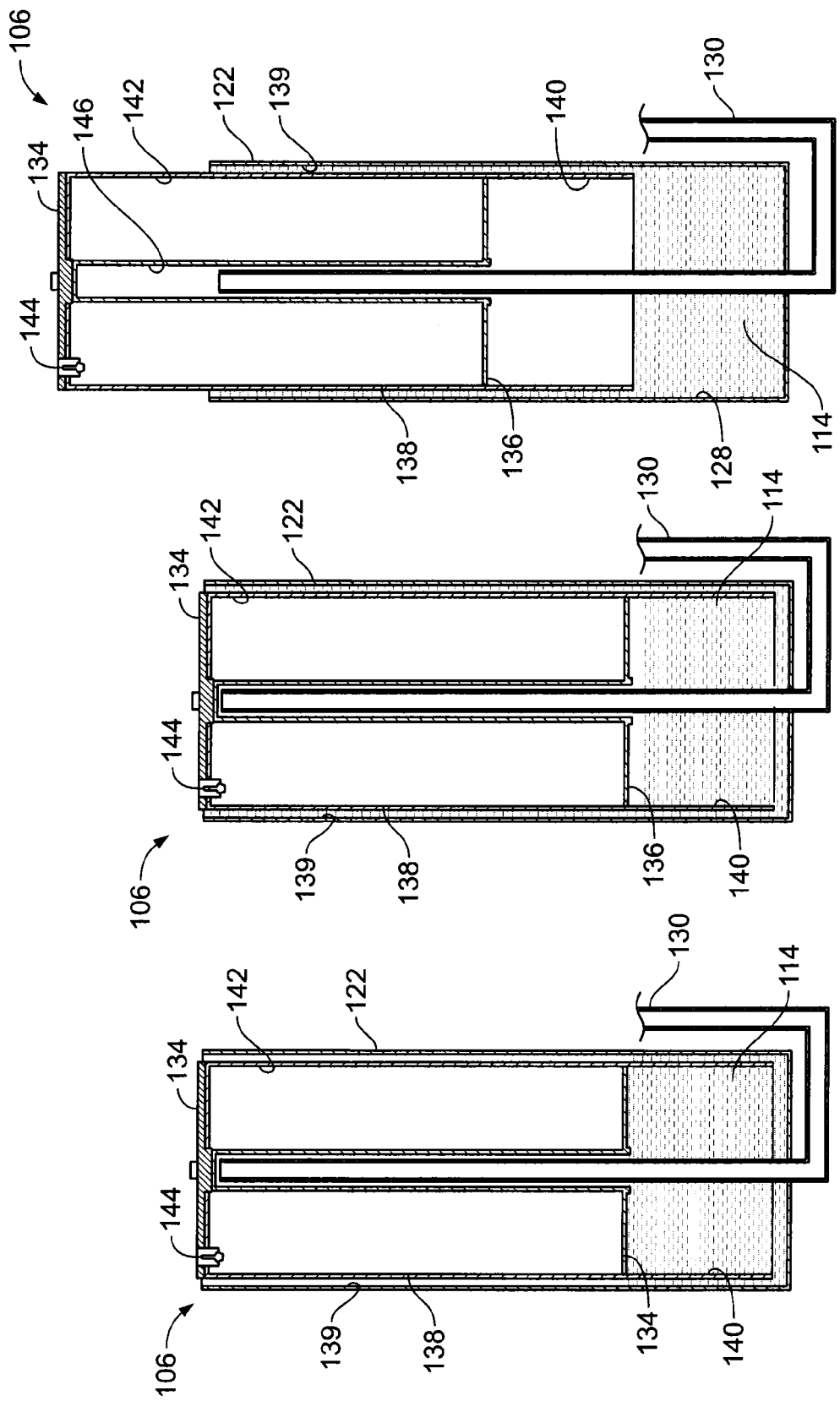

US 8,887,497 B2

APPARATUS UTILIZING BUOYANCY FORCES AND METHOD FOR USING SAME

CROSS REFERENCE TO RELATED APPLICATIONS

This application claims the benefit under 35 U.S.C. 119(e) of U.S. Provisional Application Ser. No. 61/411,772, filed Nov. 9, 2010, the entire contents of which are hereby expressly incorporated herein by reference.

BACKGROUND OF THE INVENTIVE CONCEPTS

1. Field of the Invention

The inventive concepts disclosed herein generally relate to an apparatus for utilizing buoyancy forces and to a method of using the same. More particularly, but not by way of limitation, the inventive concepts disclosed herein relate to an apparatus for utilizing buoyancy forces by multiplying the lift of several liquid columns over several surfaces of a submerged body, and to a method of using the same.

2. Brief Description of Related Art

The properties of buoyancy have been explored as a source of renewable or "green" energy because of the ability to use buoyancy forces in existing bodies of water without generating additional environmental pollution and greenhouse gases.

Existing prior art buoyancy devices typically depend on utilizing the buoyancy energy of waves, or moving waters, and as such have limited applications, as they must be installed at certain locations where waves or moving waters are available in order to work. Further, such prior art devices do not produce a consistent level of power, as the power output of such prior art devices is subject to fluctuations in waves, tides, and to seasonal water level variations.

Another problem with currently existing buoyancy devices is that they are often complicated apparatuses with multiple components, which require frequent maintenance and replacement, and are expensive to implement and operate. Further such complicated devices often suffer from low efficiency and are generally unreliable due to their overly complicated designs.

Therefore, a need exists for an apparatus that can be installed anywhere and is capable of capturing buoyancy forces to produce power consistently. It is to such an apparatus, and method for using thereof, that the instant inventive concepts are directed.

BRIEF DESCRIPTION OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, drawings, and appendices. In the drawings:

FIG. 4A is a cross-sectional view of a pod constructed in accordance with the inventive concepts disclosed herein.

FIG. 4B is a bottom plan view of the pod shown in FIG. 4A.

FIG. 4C is a top plan view of the pod shown in FIG. 4A.

FIG. 5A is a cross-sectional view of a pod and an inner ringwall according to the inventive concepts disclosed herein shown in a fully submerged state.

FIG. 5B is a cross-sectional view of the pod and ringwall shown in FIG. 5A in a pre-charged state.

FIG. 5C is a cross-sectional view of the pod and ringwall shown in FIG. 5A in a fully extended state.

DETAILED DESCRIPTION OF EXEMPLARY EMBODIMENTS

Figure 1:
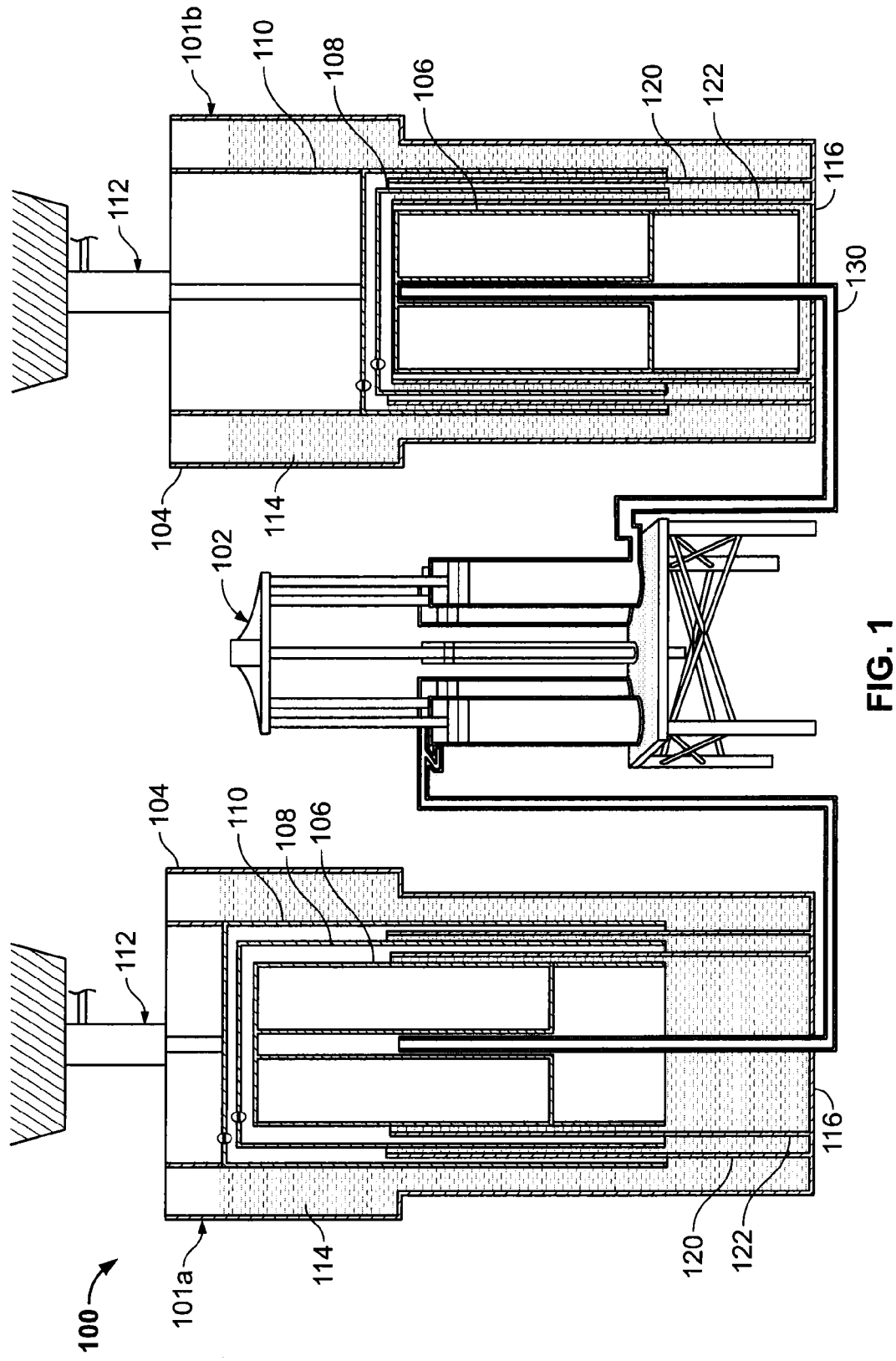
FIG. 1 is a diagrammatic view of an apparatus constructed in accordance with the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description only and should not be regarded as limiting the inventive concepts disclosed and claimed herein in any way, unless expressly stated to the contrary.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

As used herein the notation "a-n" appended to a reference numeral is intended as merely convenient shorthand to reference one, or more than one, and up to infinity, of the element or feature identified by the respective reference numeral (e.g., 100a-n). Similarly, a letter following a reference numeral is intended to reference an embodiment of the feature or element that may be similar, but not necessarily identical, to a previously described element or feature bearing the same reference numeral (e.g., 100, 100a, 100b, etc.). Such shorthand notations are used for purposes of clarity and convenience only, and should not be construed to limit the instant inventive concepts in any way, unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to FIG. 1, an exemplary embodiment of an apparatus 100 in accordance with the inventive concepts disclosed herein is shown. The apparatus 100 comprises two units 101a and 101b connected by a differential air mass exchanger 102. Each unit 101 includes an outer tank 104, a pod 106, an inner riser 108, and an outer riser 110 connected to a hydraulic capture system 112. The outer tank 104 is at least partially filled with a liquid 114, as will be described herein below.

The two units 101a and 101b are substantially identical in structure and function. Therefore, only the unit 101 will be described in detail herein.

Figure 2:
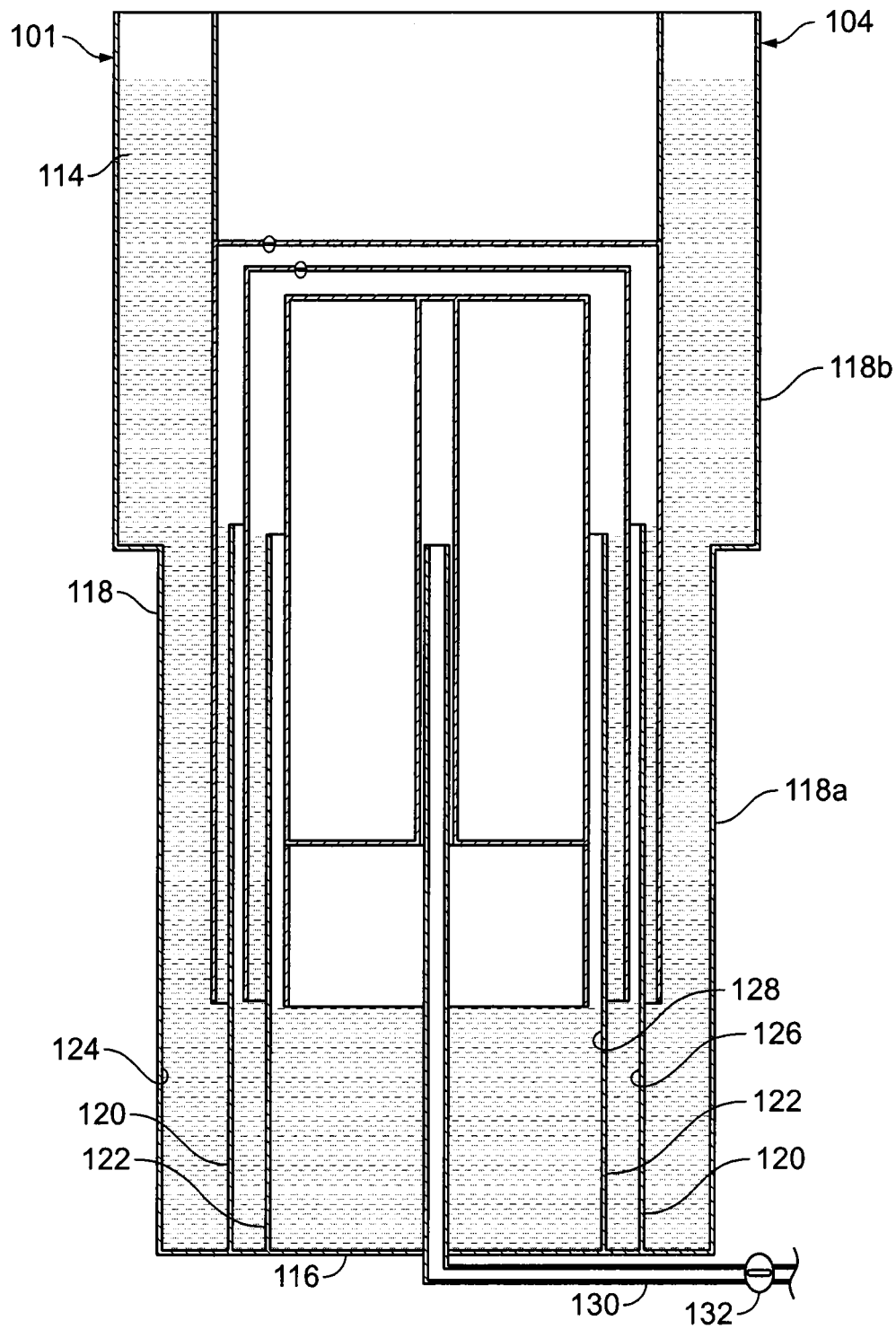
FIG. 2 is a cross-sectional view of a unit of the apparatus shown in FIG. 1.
Figure 3A:
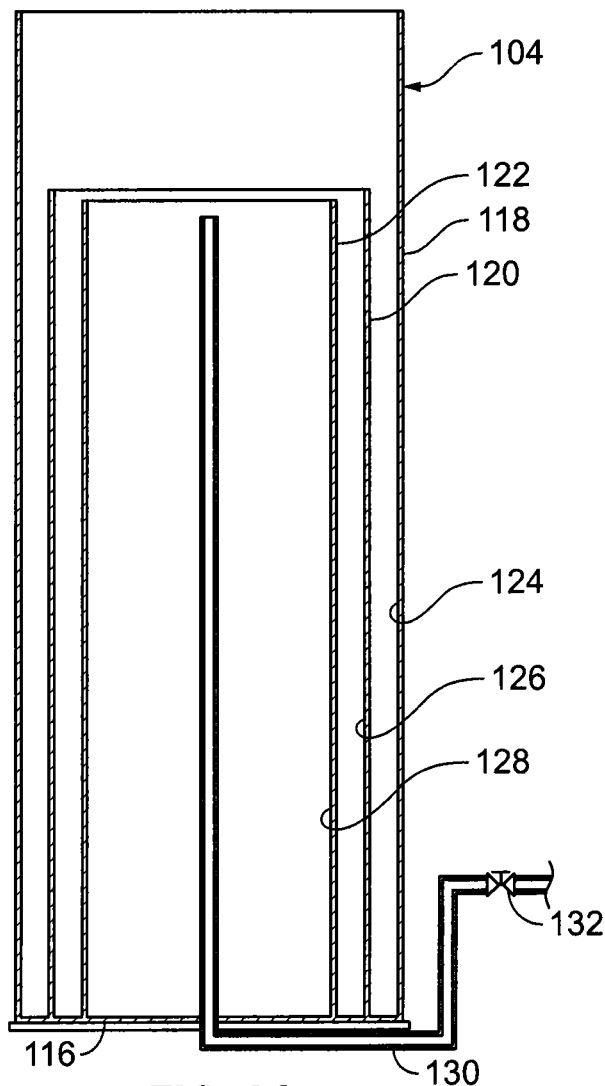
FIG. 3A is a cross-section view of an outer tank according to the inventive concepts disclosed herein.
Figure 3B:
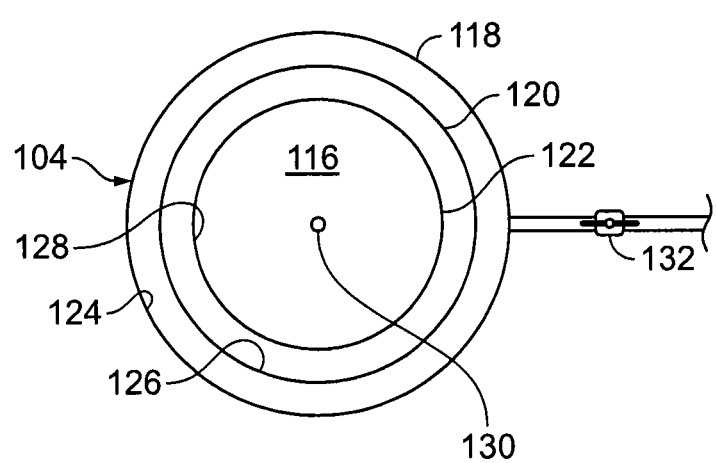
FIG. 3B is a top plan view of the outer tank shown in FIG. 3A.

Referring now to FIGS. 2-3B, the outer tank 104 can be any outer tank 104 capable of containing a liquid 114, such as water or other suitable liquid 114. The outer tank 104 may be of any suitable size and shape, but is shown substantially cylindrical in shape, and has an open end, a substantially flat horizontal bottom 116, and substantially vertically extending cylindrical tank wall 118. In some embodiments, the tank wall 118 may comprise more than one portion, such as a first tank wall portion 118a and a second tank wall portion 118b, for example. The outer tank 104 is made from steel or other non-corrosive material of sufficient strength and durability, for example. The outer tank 104 may include a lid (not shown) to protect the unit 101 and the liquid 114 inside the outer tank 104 from the elements. The lid may be lockable to prevent unauthorized access to the inside of the outer tank 104. Additionally, the outer tank 104 may comprise insulation, heating and/or cooling means, a drain valve, and a fill valve, for example.

The outer tank 104 may be stationary, or mounted on a movable platform (not shown) such as a land-based vehicle, a water-based vehicle, or an air-based vehicle, for example. The liquid 114 contained inside the outer tank 104 may be any liquid 114, such as tap water, distilled water, seawater, lake water, mineral oil, motor oil, and combinations thereof, and may comprise any number of chemical additives such as salts and/or pH buffers, depending on the environmental variables at the outer tank 104 location, and the material of choice for the outer tank 104 and the apparatus 100. In a non-limiting example, the liquid 114 used in an outer tank 104 facing extremely low temperatures may comprise ethylene glycol, water and ethylene glycol in various proportions, or other anti-freezing agents, in order to protect the liquid 114 from freezing. Additionally, the liquid 114 inside the outer tank 104 may be treated with bactericidal agents and/or other chemical or biological agents to prevent the growth of unwanted organisms, for example.

It is to be understood that the two outer tanks 104a and 104b housing the two units 101a and 101b may have different shapes and sizes, may be made of different materials, and may contain different liquids, for example. The two outer tanks 104a and 104b may, or may not be, in fluid communication with one another.

The outer tank 104 has at least two cylindrical ringwalls extending substantially vertically from the bottom 116 thereof—an outer ringwall 120 and an inner ringwall 122. The outer ringwall 120 and the inner ringwall 122 are extending substantially perpendicularly from the bottom 116 of the outer tank 104, and are substantially parallel to one another. As used herein, the term "substantially" is intended to include some slight deviations, such as due to manufacturing tolerances, warping, wear and tear, buckling due to pressure, and combinations thereof, for example.

The outer ringwall 120 extends from the bottom 116 to a first height, and the inner ringwall 122 extends from the bottom 116 to a second height. The first height is less than the height of the outer tank 104, in order for liquid 114 to freely move over the top of the outer ringwall 120. The second height may be less than the first height, and is less than the height of the outer tank 104 in order for liquid 114 to freely flow over the top of the inner ringwall 122. In some exemplary embodiments, the first height of the outer ringwall 120 and the second height of the inner ringwall 122 may be equal or substantially equal to one another, while in other embodiments the second height may be greater than the first height. The outer ringwall 120 and the inner ringwall 122 are separated by a distance, such as a distance of about 1 inch, and cooperate with the tank wall 118 to define two substantially cylindrical concentric annular spaces—a first annular space 124 between the outer ringwall 120 and the tank wall 118, and a second annular space 126 between the outer ringwall 120 and the inner ringwall 122. The inner ringwall 122 further cooperates with the bottom 116 to define a cylindrical space 128 inside the inner ringwall 122. It is to be understood, however, that the outer ringwall 120 and the inner ringwall 122 may be spaced at a distance greater than 1 inch, or lesser than 1 inch, and may define any other suitable concentric shapes, as will be understood by a person of ordinary skill in the art in light of the present disclosure.

The outer tank 104 is provided with an air conduit 130 extending substantially vertically through a center of the bottom 116 thereof. The air conduit 130 is substantially cylindrical in shape and includes a valve 132, or other means for selectively closing and opening the air conduit 130 to allow the passage of air and/or liquid 114 through the air conduit 130. The air conduit 130 extends substantially parallel to the inner ringwall 122 and is disposed within the cylindrical space 128 defined by the inner ringwall 122. The air conduit 130 extends to a height at least equal to the height of the inner ringwall 122, but it is to be understood that the air conduit 130 may extend to various heights; including heights higher or lower than the height of the inner ringwall 122, for example. The valve 132 may be any conventional valve 132, such as a ball valve, a check valve, a manual valve, and combinations thereof, for example. The air conduit may further comprise an access valve 148, which may be used to vent air or to inject air into the air conduit 130.

The outer ringwall 120, the inner ringwall 122, and the air conduit 130 may be made of any suitable material, and may be made from the same material as the outer tank 104. The outer ringwall 120, the inner ringwall 122, and the air conduit 130, may be attached to the bottom 116 of the outer tank 104 by any suitable means, such as welds, bolts, rivets, or adhesives, and combinations thereof, for example. Additionally, the outer ringwall 120, the inner ringwall 122, the air conduit 130, and the outer tank 104 may be formed as a unitary body by methods known in the art. It is to be understood that any number of ringwalls and air conduits with varying heights may be used with the inventive concepts disclosed herein, such as one, three, four, five, six, of more, for example.

Referring now to FIGS. 4A-5C, the pod 106 is substantially cylindrical in shape, has a closed top end 134, a closed bottom end 136, and cylindrical wall 138 extending at least partially below the closed bottom end 136 to define a substantially cylindrical displacement chamber 140. The closed top end 134, the closed bottom end 136, and the substantially cylindrical wall 138 of the pod 106 cooperate to define a closed chamber 142, which closed chamber 142 is filled with a gas, and is sealed and pressurized, in order to prevent the closed chamber 142 from collapsing due to the external pressure of the liquid 114. The closed chamber 142 defines a cylindrical recess 146 adapted to receive the air conduit 130 therein as will be described below.

The pod 106 is adapted to be disposed inside the cylindrical space 128 defined by the inner ringwall 122. The pod 106 is adapted to be lowered or submerged into the outer tank 104 such that the pod 106 is at least partially disposed inside the cylindrical space 128 defined by the inner ringwall 122, and is movable in a substantially vertical direction relative to the inner ringwall 122 and the outer tank 104. The wall 138 is separated from the inner ringwall 122 by a first annular gap 139. The closed top end 134 may optionally have bumper pads 135 (FIG. 14) that act to cushion impact and to distribute stress when the pod 106 comes into contact with the inner riser 108 as will be described herein below. The bumper pads 135 may be attached to the pod 106, or may be unattached, depending on the needs.

The size of the pod 106 may vary dependent upon the output needs of the apparatus 100. The volume or air injected into the pod 106 and the structural integrity of the pod 106 are matched to the safety parameters of the pressure involved with each apparatus 100. The pod 106 is internally pressurized to neutralize the possibility of implosions, such as by injecting a pressurized fluid into the closed chamber 142 via a valve 144, for example. A volume of pressurized gas may be sealed into the closed chamber 142 by a cap (not shown) welded on the top of the pod 106, and sealed as a cap at the bottom, but above the wall of the displacement chamber 140. The length of the displacement chamber 140 will vary dependent on the planned duty cycle of the pod 106. The displacement chamber 140 length is directly related to volume and stroke length.

The pod 106 may be made of any suitable material having the desired structural strength and weight, such as stainless steel, polycarbonate, plastic, fiberglass, epoxy resin, and aluminum, for example.

The function of the pod 106 is to: (a) provide lift; (b) follow the inner riser 108 in its upward travel; (c) fill the upper air gap between the pod 106 and the inner riser 108; (d) support the pre-charge function; (e) to maintain pre-charge during apparatus stroke; (f) to eliminate the need for additional gap air during cycle; (g) to serve as an open chamber where compressed air can replace liquid 114; (h) to serve as a chamber where compressed liquid 114 can replace air; (i) the specific dimensions of the pod 106 are determining for stroke length and inner riser 108 configuration. The most notable function of the pod 106 is to add lift and maintain ring wall gap and ring wall head within the unit 101.

It is to be understood that the displacement chamber 140 may optionally be located outside the unit 101, or even below the unit 101, or alternatively, two displacement chambers 140 may be used, as long as the level of the liquid 114 in the outer tank 104b is the same height as the level of liquid 114 in the outer tank 104a. Alternatively, the displacement chamber 140 may be installed unattached to the pod 106, and can be attached or welded (with openings at floor level) to an inner floor (not shown), beside the outer tank 104, or under the outer tank 104. Both arrangements may work with an apparatus 100 constructed in accordance with the inventive concepts disclosed herein.

The displacement chamber 140 attached to the floor may be used in a two-stage apparatus 100 (having two units 101), and both arrangements could be used simultaneously in a four-stage apparatus 100 to cycle each unit 101 in two stages and double the stroke length. The cost of the stroke with the displacement chamber 140 attached to the pod 106 is the loss of about three feet of differential pressure. The cost of the stroke with the displacement chamber 140 attached to the floor is less than about half of that, or about one and one-half feet of differential pressure. The input cost may be further reduced by having a wider, shorter displacement chamber 140 below the outer tank 104 (it may reduce the differential pressure loss which is the cost of the operation).

The closed chamber 142 of the pod defines the cylindrical recess 146 therein, into which cylindrical recess 146 the air conduit 130 is at least partially disposed. The air conduit 130 serves as the primary access to the displacement chamber 140, and functions to fill and evacuate air from the displacement chamber 140 without allowing liquid 114 to enter the air conduit 130. The air conduit 130 may be sized such that it is shorter than the height of the pod 106, in order to allow for a small gap to remain between the top of the air conduit 130 and the top of the cylindrical recess 146 when the pod 106 is fully lowered or submerged into the outer tank 104. The air conduit 130 may further be sized so that it fits inside the cylindrical recess 146 of the closed chamber 142 without coming into contact with the pod 106. It is to be understood that in some embodiment, the air conduit 130 may come into contact with the pod 106, such that the pod 106 may rest onto the air conduit 130, for example. The air conduit 130 fluidly connects with the differential air mass exchanger 102, and has a main shut-off valve 132 and an access valve 148 (FIG. 14) for injecting pressurized air during apparatus 100 pre-charge as will be described below.

Figure 6:
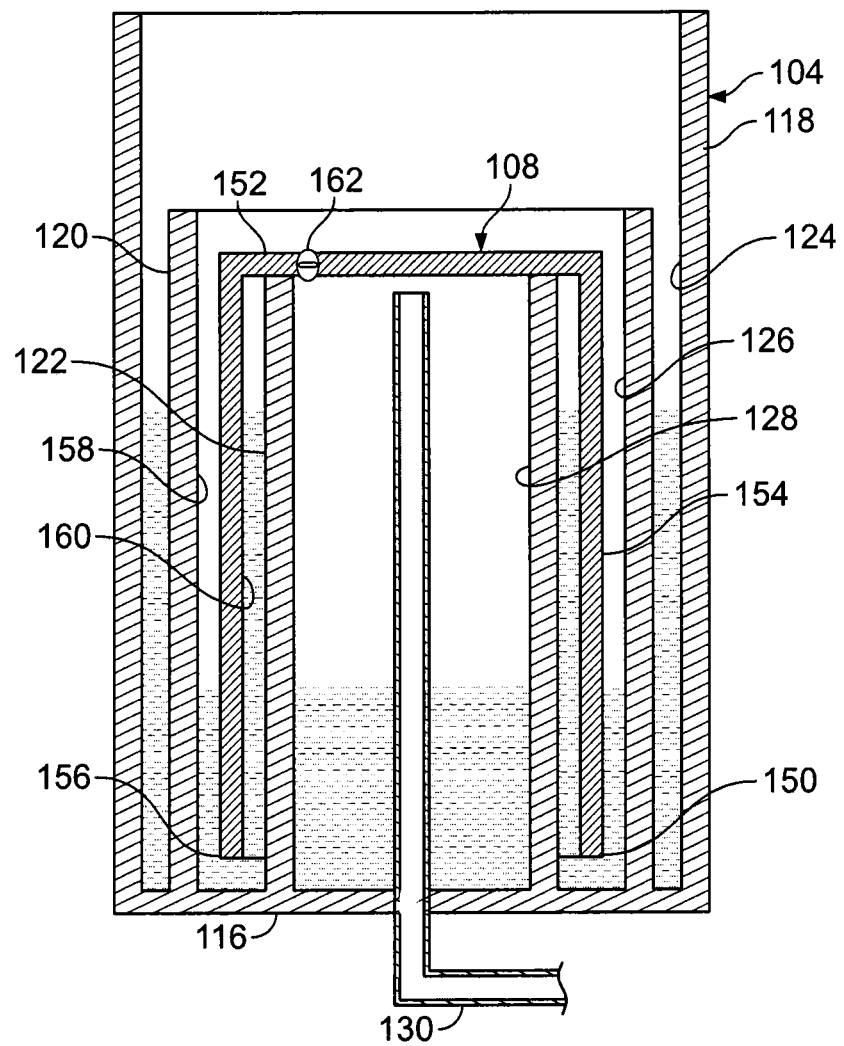
FIG. 6 is a cross-sectional view of an inner riser constructed in accordance with the inventive concepts disclosed herein shown submerged in an outer tank.

Referring now to FIG. 6, the inner riser 108 is substantially cylindrical in shape and has an open lower end 150, a closed upper end 152, a cylindrical wall 154, and defines a cylindrical space 156. The closed upper end 152 of the inner riser 108 may be hereinafter referred to as riser surface area. The inner riser 108 is inserted into the outer tank 104 with the open lower end 150 first, and its cylindrical wall 154 is sized to fit in the second annular space 126 between the inner ringwall 122 and the outer ringwall 120, such that an annular gap 158 separates the outer ringwall 120 from the inner riser 108, and an annular gap 160 separates the inner riser 108 from the inner ringwall 122. The annular gap 158 and the annular gap 160 may be at least partially filled with liquid 114 and/or air. The inner riser 108 is substantially parallel to the inner ringwall 122 and outer ringwall 120, but does not come into contact with the outer ringwall 120 and the inner ringwall 122, except that the inner riser 108 may set, or rest, on top of the inner ringwall 122 when the inner riser 108 is fully submerged inside the outer tank 104. The inner riser 108 is disposed into the outer tank 104 such that the closed upper end 152 comes into contact with the top end 134 of the pod 106.

The inner riser 108 is substantially hollow and is at least partially filled with liquid 114 and/or air. The inner riser 108 may be in gas and/or liquid communication with the outer riser 110 via at least one air vent 162, for example, or by any other suitable means known in the art. The inner riser 108 houses the pod 106.

The inner riser 108 can be made of any suitable material having the desired structural strength and weight, such as stainless steel, polycarbonate, plastic, fiberglass, epoxy resin, and aluminum, for example. The inner riser 108 is movable in a substantially vertical direction relative to the outer ringwall 120, the inner ringwall 122, and outer tank 104. The annular columns of liquid 114 separating the inner riser 108 from the outer ringwall 120 and inner ringwall 122 cooperatively exert force on the inner riser 108 to stabilize its substantially vertical motion. Each side of the outer ringwall 120, inner ringwall 122, and inner riser 108 are pressurized by the air or liquid 114 against it, the internal pressure remains slightly higher than the external pressure, and the material has been desirably engineered to withstand, buckling, implosion, and explosion.

The function of the inner riser 108 is to (a) apply lift; (b) to act as a head extender or multiplier; (c) to act as a head eliminator; (d) to convert differential pressure into lift; (e) to work in conjunction with the pod 106 and outer ringwall 120 and inner ringwall 122 to multiply the differential exchange; (f) to sink the unit 101; (g) to float the unit 101.

Figure 7:
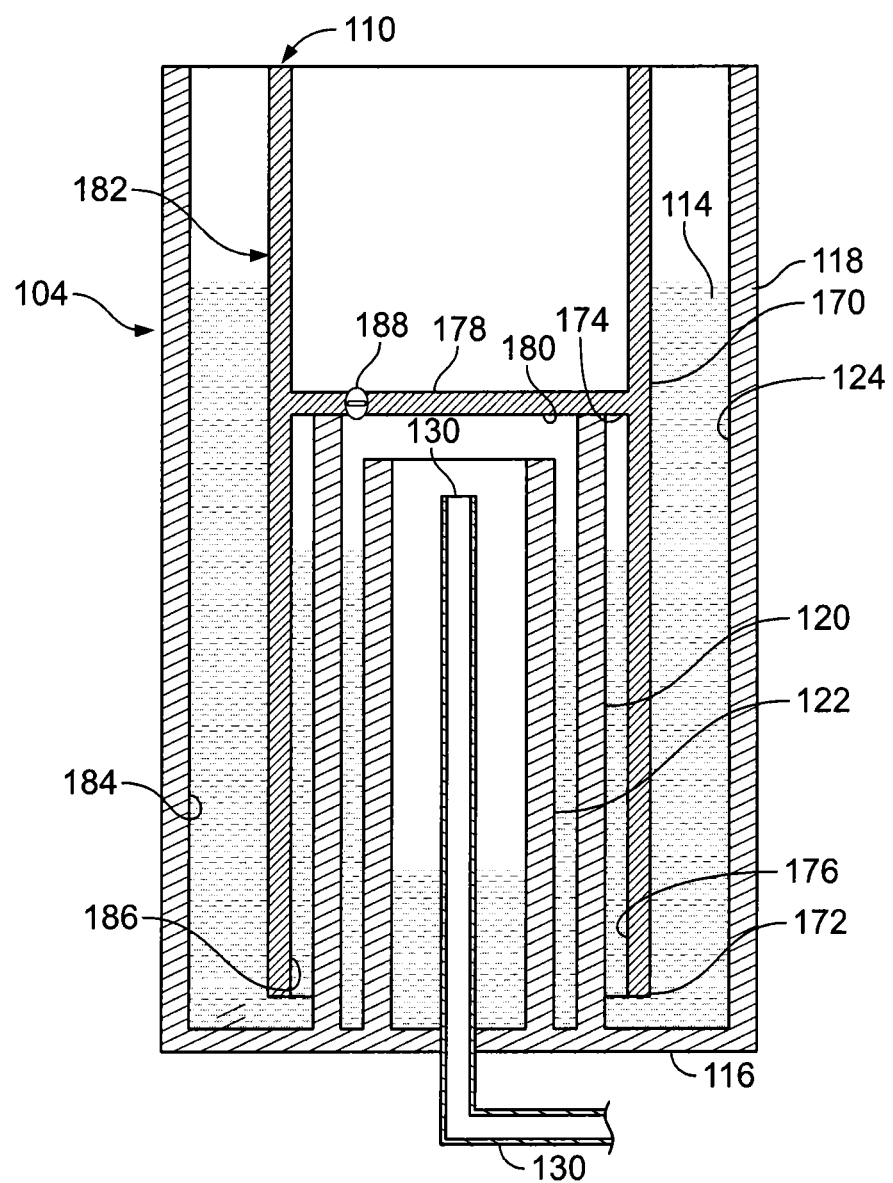
FIG. 7 is a cross-sectional view of an embodiment of an outer riser shown submerged into an outer tank according to the inventive concepts disclosed herein.
Figure 8A:
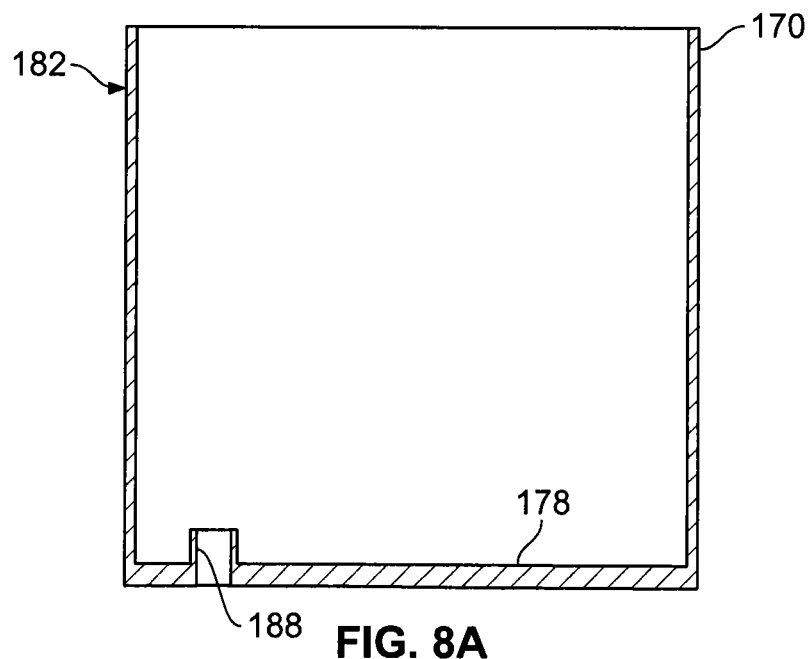
FIG. 8A is a cross-sectional view of the head-extender shown in FIG. 7.
Figure 8B:
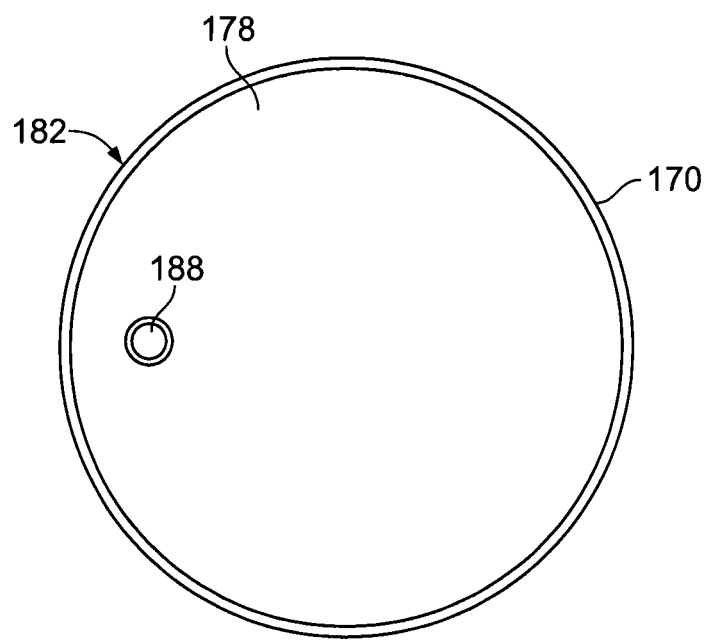
FIG. 8B is a top plan view of the head-extender shown in FIG. 8A.
Figure 9A:
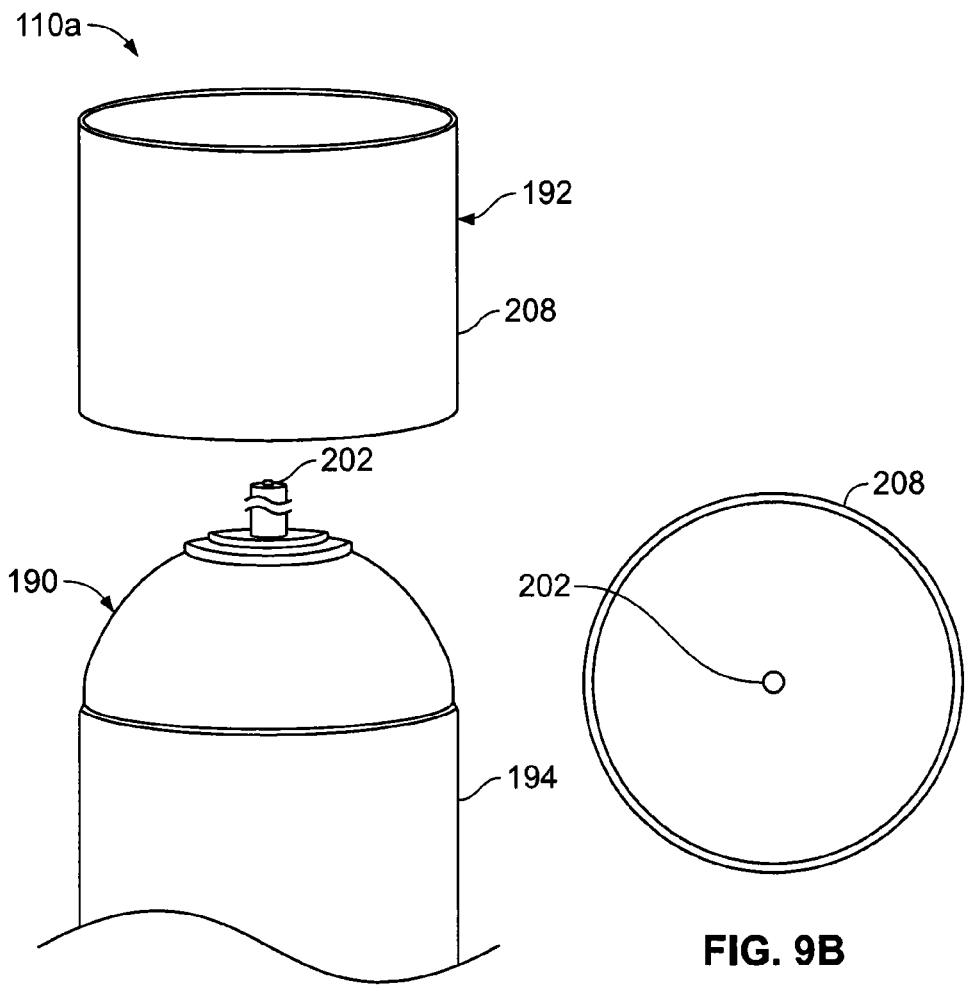
FIG. 9A is a side view of an embodiment of an outer riser constructed in accordance with the inventive concepts disclosed herein.
Figure 9B:
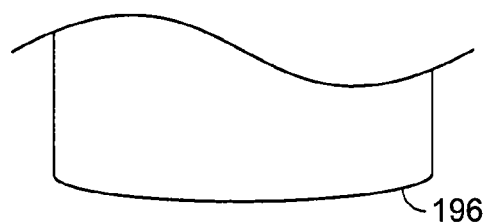
FIG. 9B is a top plan view of the outer riser shown in FIG. 9A.
Figure 9C:
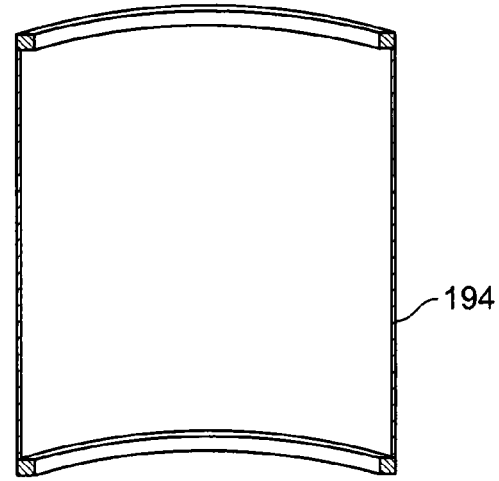
FIG. 9C is a cross-sectional view of the head-extender of the outer riser shown in FIG. 9A.
Figures 10A, 10B, 10C:
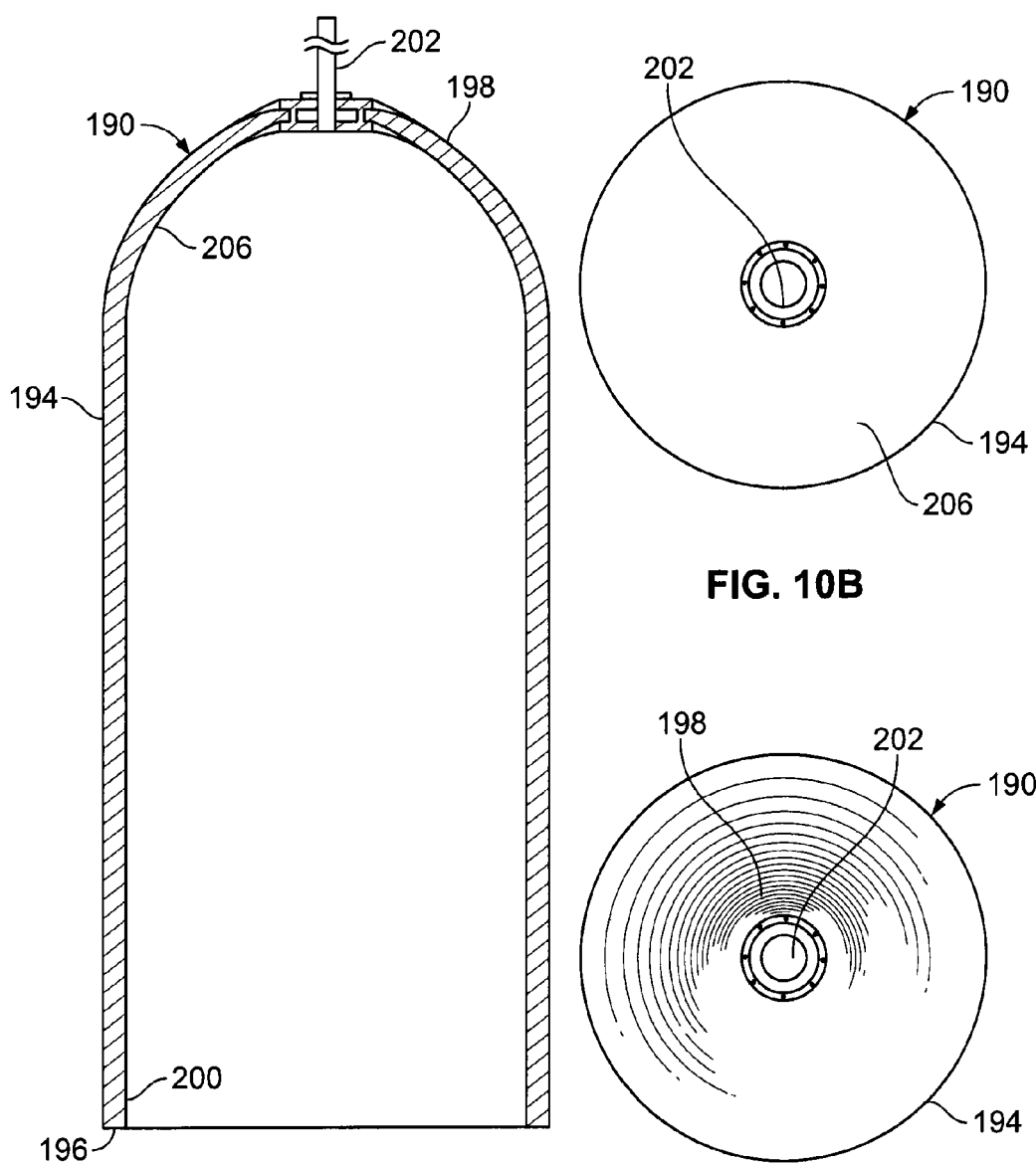
FIG. 10A is a cross-sectional view of the lower portion of the outer riser of FIG. 9A.
FIG. 10B is a bottom plan view of the lower portion of the outer riser shown in FIG. 10A.
FIG. 10C is a top plan view of the lower portion of the outer riser shown in FIG. 10A.

Referring now to FIGS. 7-8B, an exemplary embodiment of the outer riser 110 is shown as substantially cylindrical in shape. The outer riser 110 has a cylindrical wall 170, an open lower end 172, a closed upper end 174, and defines a lower cylindrical space 176.

The closed upper end 174 of the outer riser 110 has a top surface 178 and a bottom surface 180. The wall 170 extends partially above the closed upper end 174 to define a head-extender 182.

The outer riser 110 is inserted into the outer tank 104 with its open lower end 172 first, and is sized such that the wall 170 of the outer riser 110 is partially disposed in the first annular space 124 between the outer ringwall 120 and the tank wall 118. The diameter of the open lower end 172 is larger that the diameter of the outer ringwall 120 but smaller than the diameter of the outer tank 104, such that an annular gap 184 separates the outer ringwall 120 from the wall 170 of the outer riser 110, when the outer riser 110 is inserted into the outer tank 104. The annular gap 184 may be at least partially filled with liquid 114 and/or air. At the same time, an annular gap 186 separates the wall 170 from the tank wall 118. The annular gap 186 may be at least partially filled with liquid 114 and/or air.

In order to submerge the outer riser 110 into the outer tank 104, an air vent 188 is used to vent the air from inside the closed upper end 174 of the outer riser 110 to the atmosphere. This air vent 188 is briefly opened during the initial stage, and remains closed during operation of the apparatus 100. The wall 170 of the outer riser 110 is oriented parallel to the outer ringwall 120 when the outer riser 110 is inserted into the outer tank 104.

When the outer riser 110 is fully submerged in the outer tank 104, the wall 170 of the outer riser 110 extends above the surface of the liquid 114 in the outer tank 104 to keep the head-extender 182 substantially free of liquid 114, and to extend the head surrounding the outer riser 110.

The bottom surface 180 of the lower cylindrical space 176 sets (or rests) upon the top of the outer ringwall 120 when the outer riser 110 is fully submerged inside the outer tank 104. The lower cylindrical space 176 encompasses the outer ringwall 120 and the inner ringwall 122 when the outer riser 110 is inserted into the outer tank 104, and houses the pod 106 and the inner riser 108. The lower cylindrical space 176 is at least partially filled with liquid 114 and/or air. The lower cylindrical space 176 is in gas and/or liquid communication with the head-extender 182 via the air vent 188, or by any other suitable means known in the art, for example.

The outer riser 110 may be made of any suitable material having the desired structural strength and weight, such as stainless steel, polycarbonate, plastic, fiberglass, epoxy resin, and aluminum, for example. The outer riser 110 is movable in a substantially vertical direction relative to the outer tank 104 and the outer ringwall 120. The liquid 114 which partially fills the annular gap 184 between the outer riser 110 and the outer ringwall 120, and the annular liquid column inside the annular gap 186 separating the outer riser 110 and the tank wall 118, cooperatively exert force on the outer riser 110 to keep it moving substantially vertically. This process may be hereinafter referred to as "hydro-pneumatic dynamic centering" or "dynamic centering" for brevity. Additionally, the motion of the outer riser 110 may be kept substantially vertical by wear guides (not shown) installed on the outer ringwall 120 and the inner ringwall 122 and on the wall 170 defining the lower cylindrical space 176 of the outer riser 110. Further, in some exemplary embodiments, one or more weights may be placed onto, or otherwise connected to the outer riser 110 to assist in submerging the unit 101.

Referring now to FIGS. 9A-10C, shown therein is an exemplary embodiment of an outer riser 110a. The outer riser 110a comprises a lower portion 190, to which a cylindrical head-extender 192 is attached. The lower portion 190 is substantially cylindrical in shape, and has a cylindrical wall 194, an open lower end 196, a concave closed upper end 198, and defines a lower cylindrical space 200. The outer riser 110a is inserted into the outer tank 104 with its open lower end 196 first, and is sized such that the outer riser 110 is partially disposed in the first annular space 124 between the outer ringwall 120 and the tank wall 118. The diameter of the open lower end 196 is larger that the diameter of the outer ringwall 120, such that an annular gap separates the outer ringwall 120 from the wall 194, when the outer riser 110a is inserted into the outer tank 104. The annular gap may be at least partially filled with liquid 114 and/or air. At the same time, the diameter of the open lower end 196 is smaller than the diameter of the outer tank 104, such that an annular gap separated the tank wall 118 of the outer tank 104 and the wall 194 of the outer riser 110a. In order to submerge the outer riser 110a, an air vent 202 is used to vent the air from inside the closed upper end 198 to the atmosphere. This air vent 202 is briefly opened during the initial stage, and remains closed during operation of the apparatus 100. The wall 194 is oriented parallel to the outer ringwall 120 when the outer riser 110a is inserted into the outer tank 104. The closed upper end 198 has a top surface 204 and a bottom surface 206.

The head-extender 192 comprises a wall 208 which extends above the surface of the liquid 114 in the outer tank 104 to keep the head-extender 192 substantially liquid-free, and to extend the head surrounding the outer riser 110, when the outer riser 110a is inserted into the outer tank 104. The head-extender 192 may be attached to the lower portion 190 in any suitable way, such as by using a flange (not referenced), welds, seams, joints, bolts, adhesives, and combinations thereof, for example.

The bottom surface 206 of the lower cylindrical space 200 may set (or rest) upon the top of the outer ringwall 120 when the outer riser 110a is fully submerged inside the outer tank 104. The lower cylindrical space 200 encompasses the outer ringwall 120 and the inner ringwall 122 when the outer riser 110a is inserted into the outer tank 104, and houses the pod 106 and the inner riser 108. The lower cylindrical space 200 is at least partially filled with liquid 114 and/or air. The lower cylindrical space 200 is in gas and/or liquid communication with the head-extender 192 via the air vent 202, or by any other suitable means known in the art, for example.

The outer riser 110a may be implemented similarly to the outer riser 110, for example. The outer riser 110a is movable in a substantially vertical direction relative to the outer tank 104 and the outer ringwall 120. The liquid 114 which partially fills the first annular space 124 between the outer riser 110a and the outer ringwall 120, and the annular liquid column separating the outer riser 110a and the tank wall 118, cooperatively exert force on the outer riser 110a to keep it moving substantially vertically.

Figure 11:
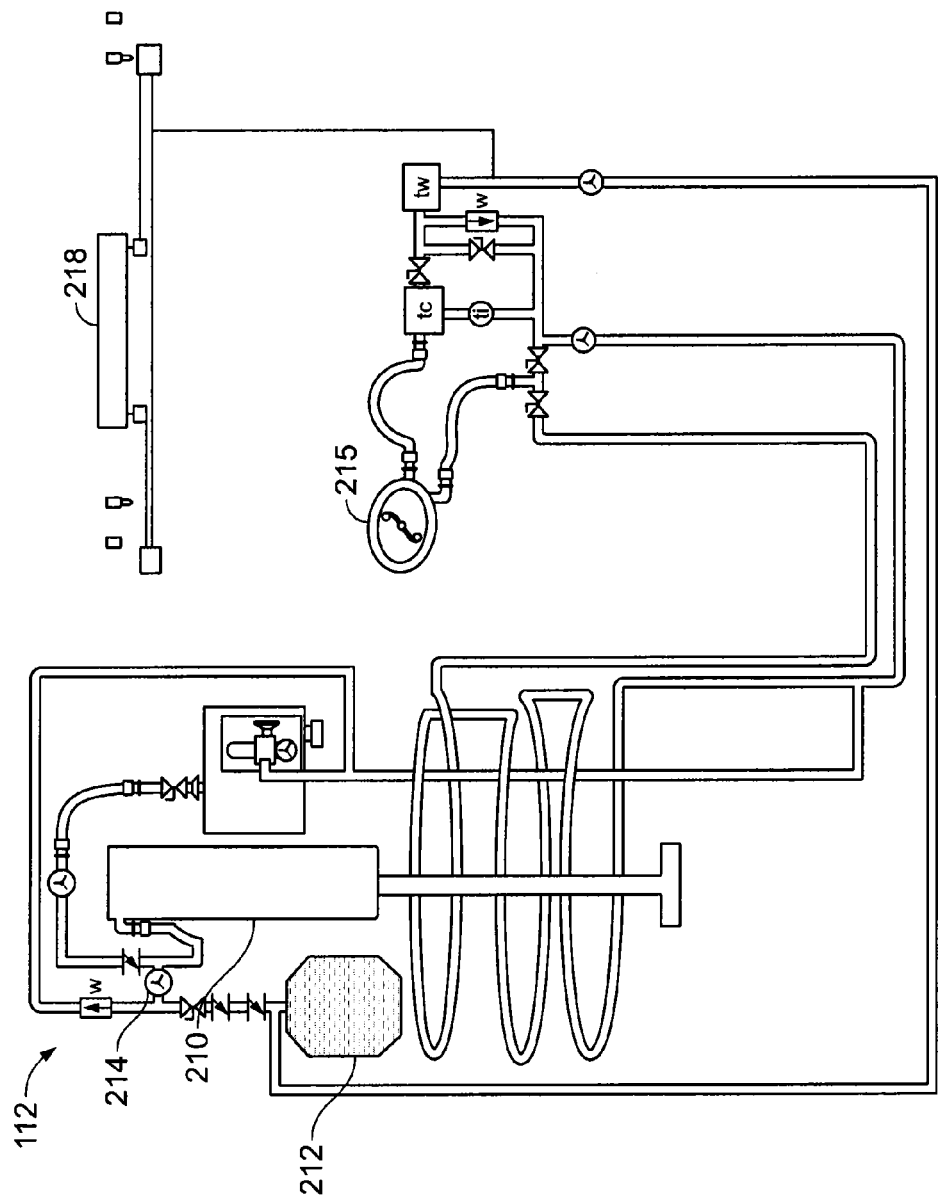
FIG. 11 is a diagrammatic view of a hydraulic capture system according to the inventive concepts disclosed herein.

Referring now to FIG. 11, the hydraulic capture system 112 comprises a hydraulic capture cylinder 210, a hydraulic accumulator 212 in fluid communication with the hydraulic capture cylinder 210, and a shut-off valve 214.

The hydraulic capture cylinder 210 is attached to, or connected with, the outer riser 110, and is in fluid communication with the hydraulic accumulator 212. The hydraulic capture cylinder 210 moves with the outer riser 110 of the apparatus 100 and pumps pressurized hydraulic fluid into the hydraulic accumulator 212 when the lift pressure of the apparatus 100 exceeds the minimum pressure setting at the hydraulic accumulator 212. When the minimum pressure is exceeded, the hydraulic fluid is stored under pressure inside the hydraulic accumulator 212 until it is consumed as will be described below.

The shut-off valve 214 may be operated to lock, or prevent, the hydraulic capture cylinder 210 from moving, thereby also preventing the outer riser 110 from moving during the pre-charge stage of the unit 101 setup.

An optional hydraulic motor 215 of hydraulic generator (not shown) may be fluidly connected to the hydraulic accumulator 212 and may generate mechanical or electrical energy by using pressurized hydraulic fluid from the hydraulic accumulator 212.

Figure 12:
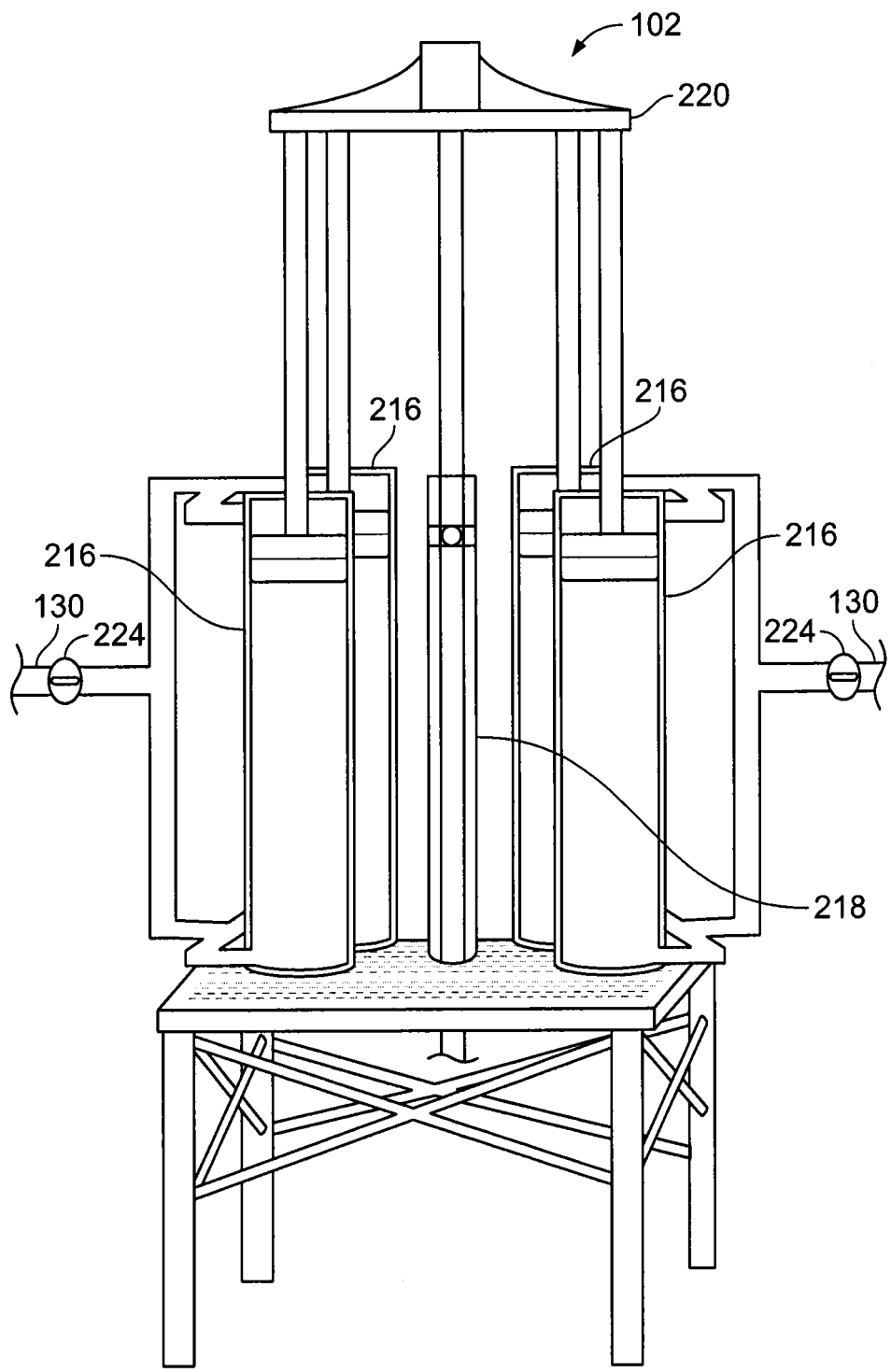
FIG. 12 is a perspective view of an embodiment of a differential air mass exchanger in accordance with the inventive concepts disclosed herein.

Referring now to FIG. 12, a differential air mass exchanger 102 according to the inventive concepts disclosed herein comprises one or more cylinders 216 in fluid communication with the air conduit 130, a hydraulic assist 218 in fluid communication with the hydraulic accumulator 212.

The differential air mass exchanger 102 can have one or more cylinders 216 arranged in such a way as to separate volumes of air of equal sizes and allow pressures to exist on both sides of the cylinder 216. The cylinders 216 are fluidly connected to the pod 106 via the air conduit 130 and are movable between a first position and a second position to displace a volume of liquid 114 from the displacement chamber 140, by forcing a volume of air inside the displacement chamber 140 through the air conduit 130. The cylinders 216 are further connected to the actuator bar 220, such that the actuator bar 220 moves as the cylinders 216 move between a first position and a second position.

The hydraulic assist 218 may be implemented as a hydraulic piston, or in any other suitable way, for example. The hydraulic assist 218 is in fluid communication with the hydraulic accumulator 212, and is sized to provide adequate power to the differential air mass exchanger 102 as will be described below. The hydraulic assist 218 is attached to the actuator bar 220 and is capable of selectively applying force to the actuator bar 220, such that the hydraulic assist 218 may assist the movement the cylinders 216 between the first position and the second position. The force used by the hydraulic assist 218 is supplied from pressurized hydraulic fluid received from the hydraulic accumulator 212. The hydraulic assist 218 moves the actuator bar 220, which in turn assists the action of the differential air mass exchanger 102.

Figure 13:
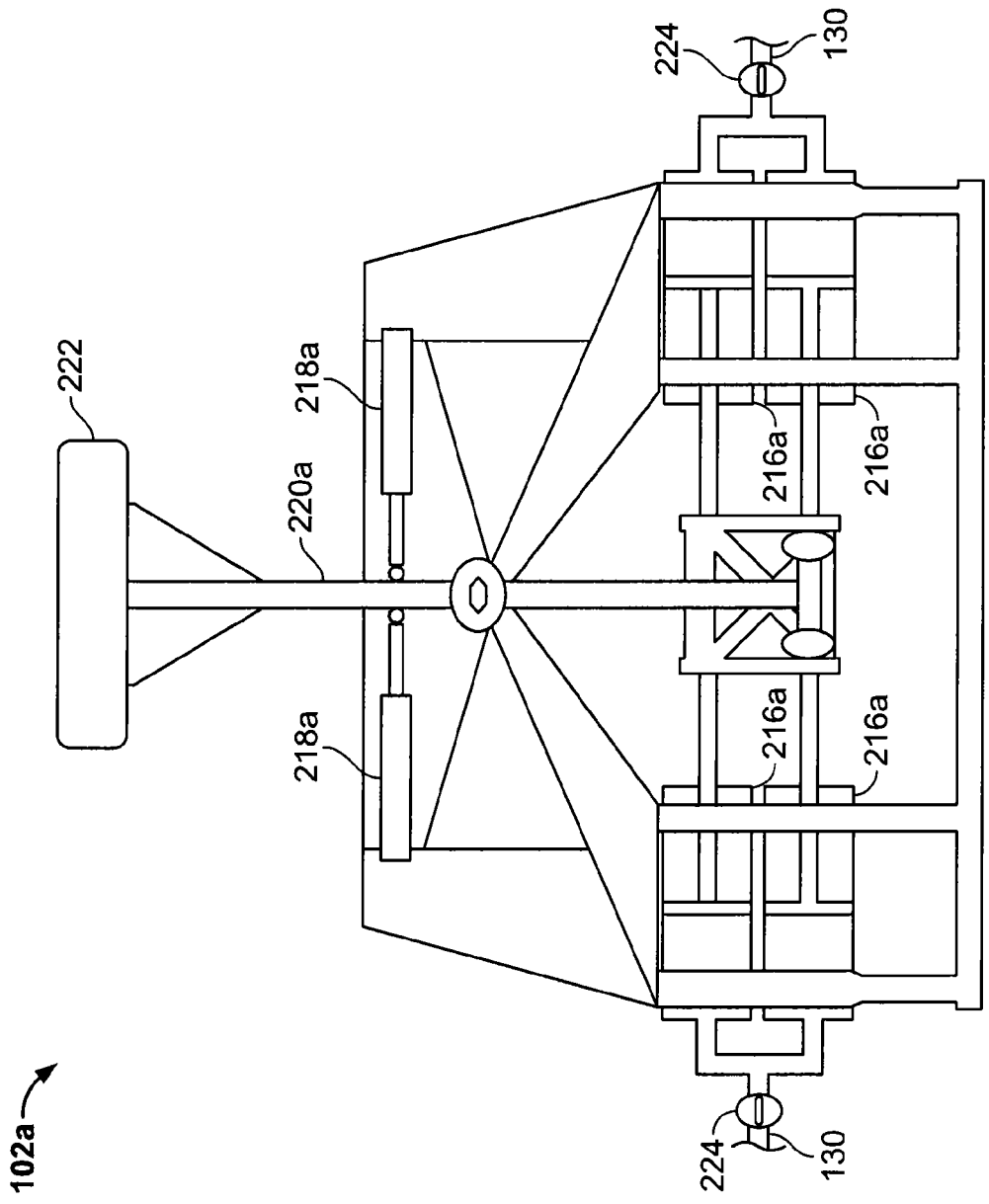
FIG. 13 is a front view of an embodiment of a differential air mass exchanger in accordance with the inventive concepts disclosed herein.

Referring now to FIG. 13, an embodiment of a differential air mass exchanger 102a is shown therein. The differential air mass exchanger 102a can be implemented similarly to the air mass exchanger 102 and comprises one or more cylinders 216a in fluid communication with the air conduit 130, a hydraulic assist 218a in fluid communication with the hydraulic accumulator 212, an actuator bar 220a, and a counterweight 222.

The differential air mass exchanger 102a can have one or more cylinders 216 arranged in such a way as to separate volumes of air of equal sizes and allow pressures to exist on both sides of the cylinder 216a. The cylinders 216a are fluidly connected to the pod 106 via the air conduit 130 and are movable between a first position and a second position to displace a volume of liquid 114 from the displacement chamber 140, by forcing a volume of air inside the displacement chamber 140 through the air conduit 130. The cylinders 216a are further connected to the actuator bar 220a, such that the actuator bar 220a moves as the cylinders 216a move between a first position and a second position.

The hydraulic assist 218a may be implemented as a hydraulic piston, or in any other suitable way, for example. The hydraulic assist 218a is in fluid communication with the hydraulic accumulator 212, and is sized to provide adequate power to the differential air mass exchanger 102a as will be described below. The hydraulic assist 218a is attached to the actuator bar 220a and is capable of selectively applying force to the actuator bar 220a, such that the hydraulic assist 218a may assist the movement the cylinders 216a between the first position and the second position. The force used by the hydraulic assist 218a is supplied from pressurized hydraulic fluid received from the hydraulic accumulator 212. The hydraulic assist 218a moves the actuator bar 220a, which in turn assists the action of the differential air mass exchanger 102a. The actuator bar 220a has a counterweight 222 attached thereto, the counterweight 222 is used to both regulate the exchange, and to assist the exchange after the halfway point between the first position and the second position of the cylinders 216a is reached.

The initial power from the lowering unit 101 is greater than needed at the beginning of the exchange, equal at the halfway point, and dropping until the differential is reached. The counterweight 222 makes it possible to capture the initial excess energy and then utilize the counterweight 222 to assist the differential air mass exchanger 102 during the descent of power. The hydraulic assist 218a is used to compensate for the differential loss by using the pressurized hydraulic fluid from the hydraulic accumulator 212. The differential air mass exchanger 102a may be connected to at least two units 101a and 101b, when additional work is added to one side of the differential air mass exchanger 102; the cylinder 216 travels in the opposite direction. The additional work can be supplied directly or mechanically. The differential air mass exchanger 102 is utilized to control the speed of the pre-charge and cycle/stroke of the apparatus 100.

The motion of the differential air mass exchanger 102 is regulated through the use of flow controls on the hydraulic assist 218, such as the hydraulic shut-off valve 214 (FIG. 11), or other valves, such as check valves, or flow control valves, and combinations thereof, for example. This makes it possible to regulate the speed of the exchange of air between the unit 101a and the unit 101b. The rate of exchange is metered by response to the sustaining lift of the outer riser 110 in relationship to the production of hydraulic fluid at a given pressure.

The motion or operation of the unit 101 of the apparatus 100 is regulated by the hydraulic input requirements. The speed at which this hydraulic input is obtained and maintained is by controlling the flow of the differential air mass exchanger 102. The differential air mass exchanger 102 uses three forces to operate—the exhaust air from the lowering unit 101 which is exerted onto the cylinders 216, the action of the counterweight 222, and the force applied on the actuator bar 220 by hydraulic assist 218. The exhaust air from unit 101a is under pressure and it is directed to the differential air mass exchanger 102 which in turn assists in overcoming the pressure requirements of the displacement chamber 140 of the unit 101b.

The locking mechanism for the differential air mass exchanger 102 is the shut-off valve 224 to the cylinders 216. In order to remove the possibility of movement of the differential air mass exchanger 102, the air is vented from the cylinders 216 of the differential air mass exchanger 102 to atmosphere. A complete reset/set up of the apparatus 100 would be required after venting the air from the cylinders 216 of the differential air mass exchanger 102.

The process of assembling, submerging, and pre-charging the apparatus 100 will be explained referring to a single unit 101 only. It is to be understood that the same process is repeated for unit 101a and unit 101b of the apparatus 100. The set up with regards to the differential air mass exchanger 102 will be explained in detail below.

Referring now to FIGS. 14-17, the unit 101 is assembled by first filling the outer tank 104 with liquid 114, such that the level of liquid 114 is higher than the heights of the outer ringwall 120 the inner ringwall 122, the first annular space 124, the second annular space 126, and the cylindrical space 128. The first annular space 124, the second annular space 126, and the cylindrical space 128 are substantially completely filled with the liquid 114. The amount of liquid 114 used will vary with the size of the apparatus 100 and outer tank 104. When two outer tanks 104a and 104b are used, both should be filled with liquid 114 as described, and the differential air mass exchanger 102 should to be fluidly connected to the air conduits 130 of both outer tanks 104a and 104b.

Next, the pod 106 is submerged inside the cylindrical space 128 defined by the inner ringwall 122. Any air that is retained in the displacement chamber 140 is vented through selectively opening the access valve 148 of the air conduit 130, in order to remove the positive buoyancy of the pod 106 and to allow the pod 106 to be completely submerged, such that the displacement chamber 140 of the pod 106 rests on the bottom 116 of the outer tank 104. Enough air is vented out of the displacement chamber 140 to make the pod 106 at least neutrally buoyant at this stage.

Once the pod 106 is completely submerged, the inner riser 108 is inserted into the outer tank 104 with its open lower end first. The inner riser 108 is submerged such that it is partially disposed in the second annular space 126 defined between the inner ringwall 122 and the outer ringwall 120. The inner riser 108 is lowered inside the outer tank 104 until the inner riser 108 rests on top of the inner ringwall 122 as described above. Any air trapped inside the inner riser 108 may be vented out by briefly opening the air vent 162, for example. Once the inner riser 108 is fully submerged, the air vent 162 is closed, and remains closed throughout the operation of the apparatus 100.

Next, the outer riser 110 is submerged inside the outer tank 104 with its open lower end 196 first, such that the outer riser 110 is partially disposed in the first annular space 124 between the outer ringwall 120 and the tank wall 118. Any air trapped inside the outer riser 110 is vented out via the air vent 188. The outer riser 110 is lowered inside the outer tank 104 until it rests on top of the outer ringwall 120. Once the outer riser 110 is fully submerged, the air vent 188 is closed, and it remains closed throughout the operation of the apparatus 100.

The level of liquid 114 inside the outer tank 104 may be adjusted at this time to ensure the head-extender 182 of the outer riser 110 remains substantially liquid-free. It is to be understood that the pre-charge of the apparatus 100 will result in a rise in the level of the liquid 114 in the outer tank 104, so a sufficient clearance between the level of the liquid 114 and the top of the head-extender 182 should be maintained.

Figure 14:
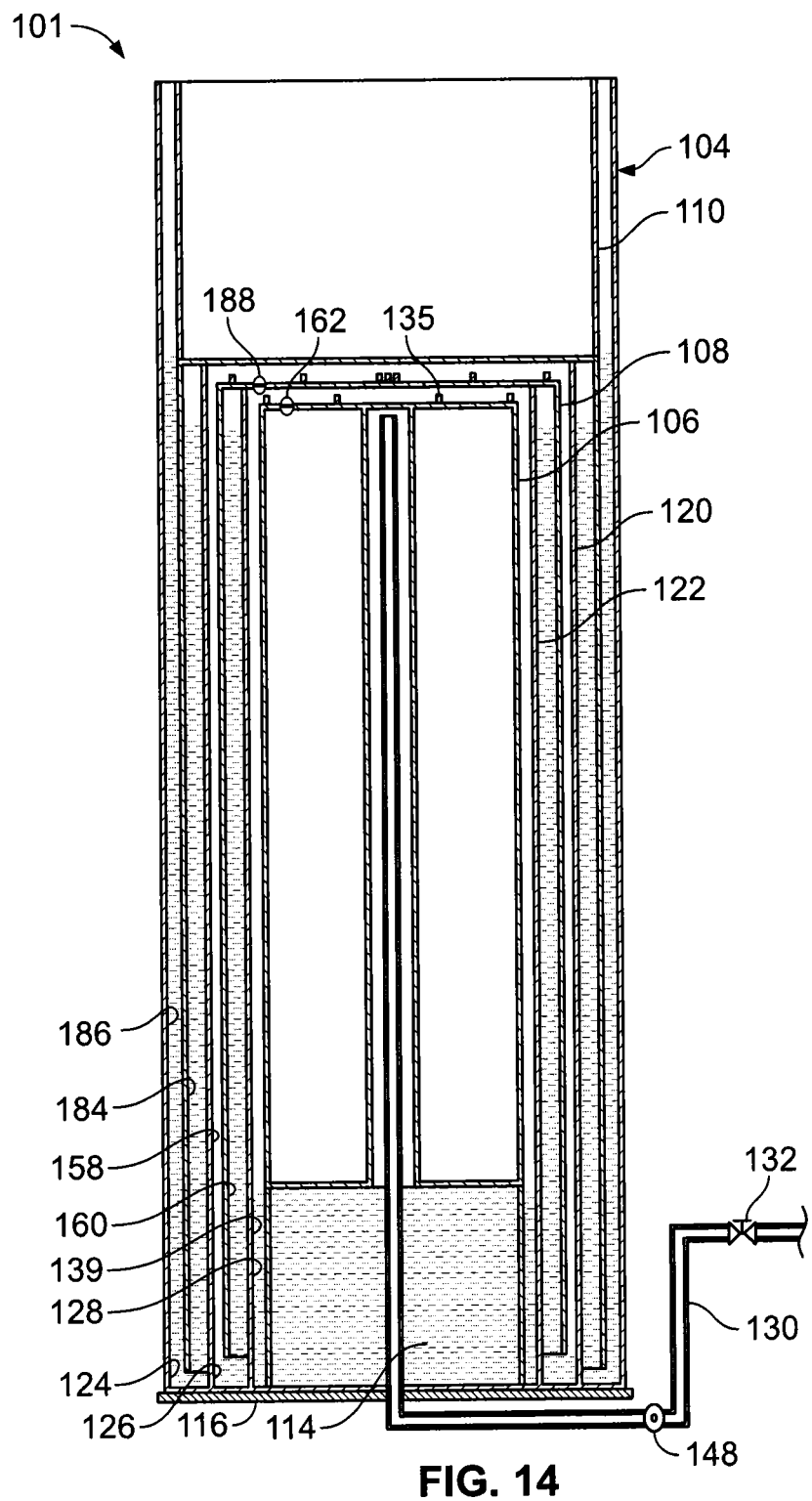
FIG. 14 is a cross-sectional view of an apparatus constructed according to the inventive concepts disclosed herein shown in a fully submerged state.

At the initial stage shown in FIG. 14, the unit 101 is completely submerged, and is at least neutrally buoyant, but may also be negatively buoyant. The pod 106, inner riser 108, outer riser 110, outer ringwall 120, inner ringwall 122, and outer tank 104 define a series of interconnected compartments that form a substantially serpentine shaped flow path as will be described below. The various compartments defined by the parts of the apparatus 100 are substantially full of liquid 114 at this stage, although it is to be appreciated that some amount of air may be present in at least one, more than one, or all of the various compartments. It is to be further appreciated that some air is usually present inside the cylindrical recess 146 of the closed chamber 142 to ensure that no liquid 114 enter the air conduit 130 and/or the differential air mass exchanger 102.

The unit 101 is now ready to be pre-charged. During pre-charge, the unit 101 is prevented from travelling upwards by operating the hydraulic system shut-off valve 214 as described above.

Figure 15:
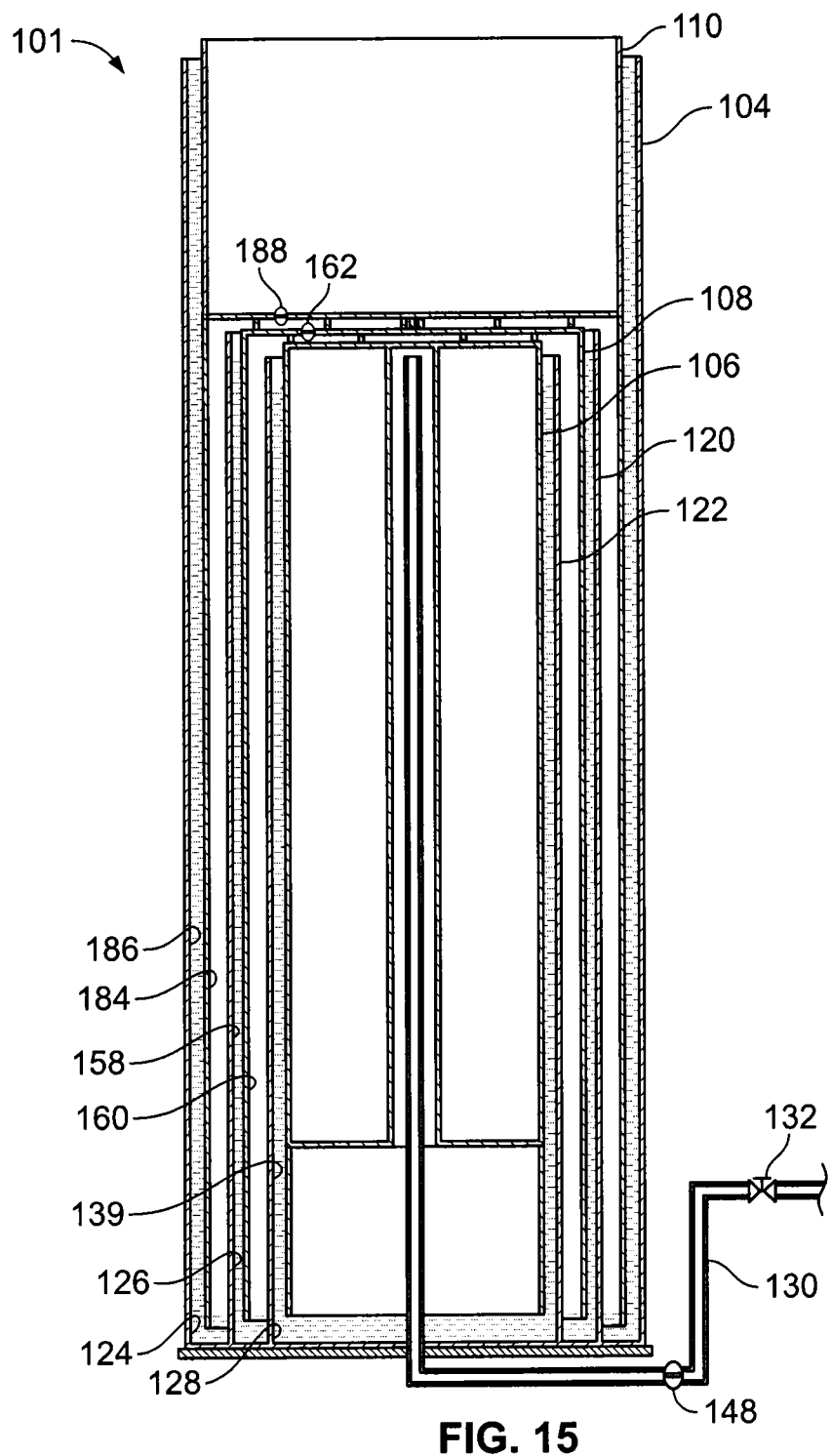
FIG. 15 is a cross-sectional view of the apparatus shown in FIG. 14 in a pre-charged state.

In this step, pressurized air, or other suitable gas, is injected inside the displacement chamber 140 via the access valve 148. The pressurized air may be supplied from an air compressor (not shown), for example. The valve 132 may be closed at this stage to prevent the pressurized air from reaching the differential air mass exchanger 102. At this point, the pod 106 starts to rise and begins to close the gap between the top of the pod 106 and the inner riser 108, as best shown in FIG. 15. As the air pressure builds inside the displacement chamber 140, a volume of liquid 114 is pushed out from the displacement chamber 140. This in turn forces liquid 114 upwards inside the first annular gap 139 separating the pod 106 and the inner ringwall 122, which liquid 114 is further forced to move through the successive compartments by flowing downwards through the annular gap 160 separating the inner riser 108 and the inner ringwall 122, upwards through the annular gap 158 separating the inner riser 108 and the outer ringwall 120, again downwards through the annular gap 184 separating the outer ringwall 120 and the outer riser 110, and finally upwards through the annular gap 186 separating the outer riser 110 and the tank wall 118. This results in a gradual increase in the level of liquid 114 in the outer tank 104, so the liquid level should be monitored to ensure that the head-extender 182 remains substantially liquid-free.

Figure 16:
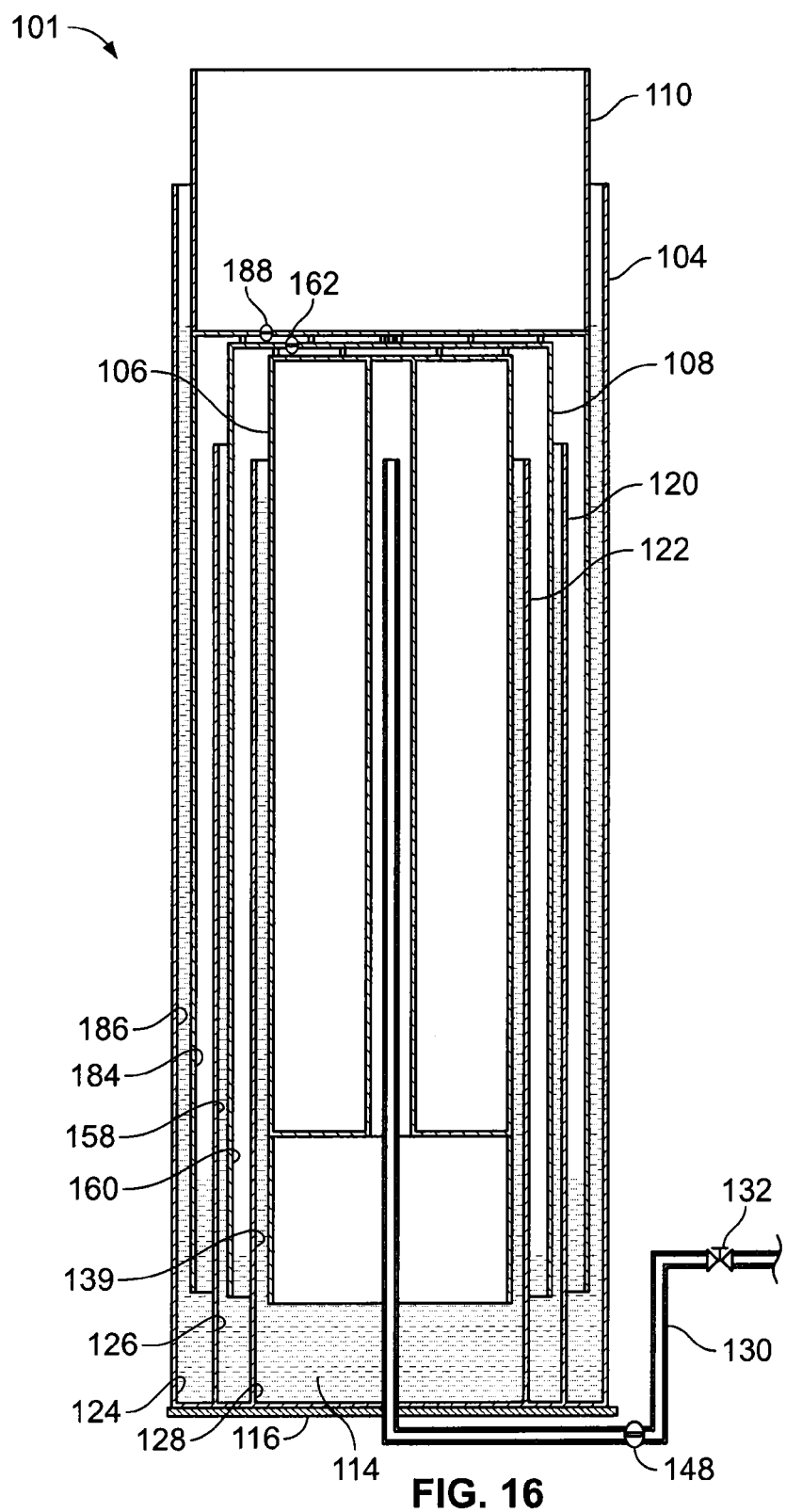
FIG. 16 is a cross-sectional view of the apparatus shown in FIG. 14 in the mid-point between a submerged state and an extended state.
Figure 17:
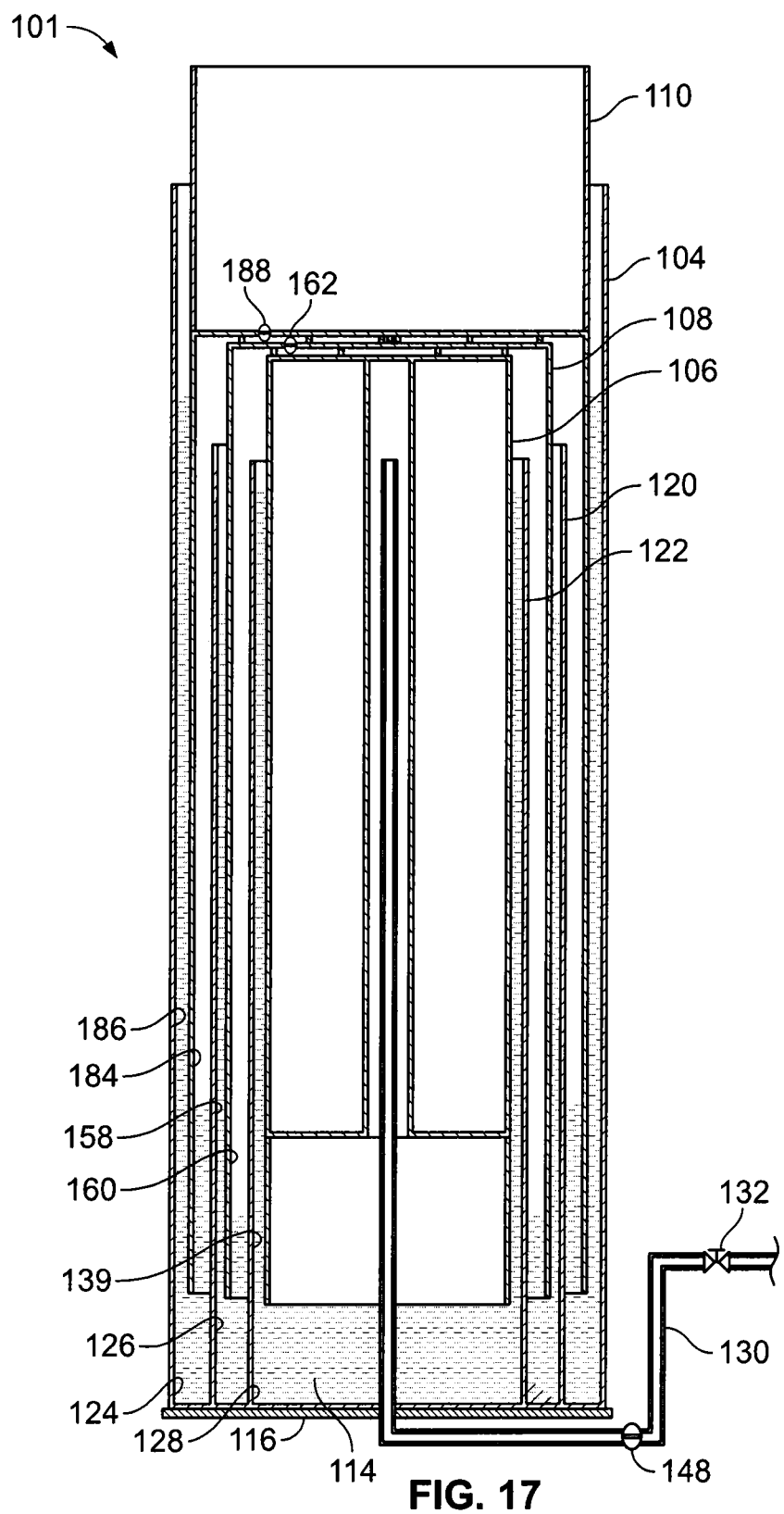
FIG. 17 is a cross-sectional view of the apparatus shown in FIG. 14 in the mid-point between a submerged and an extended state, with the air expansion not shown for clarity.
Figure 18:
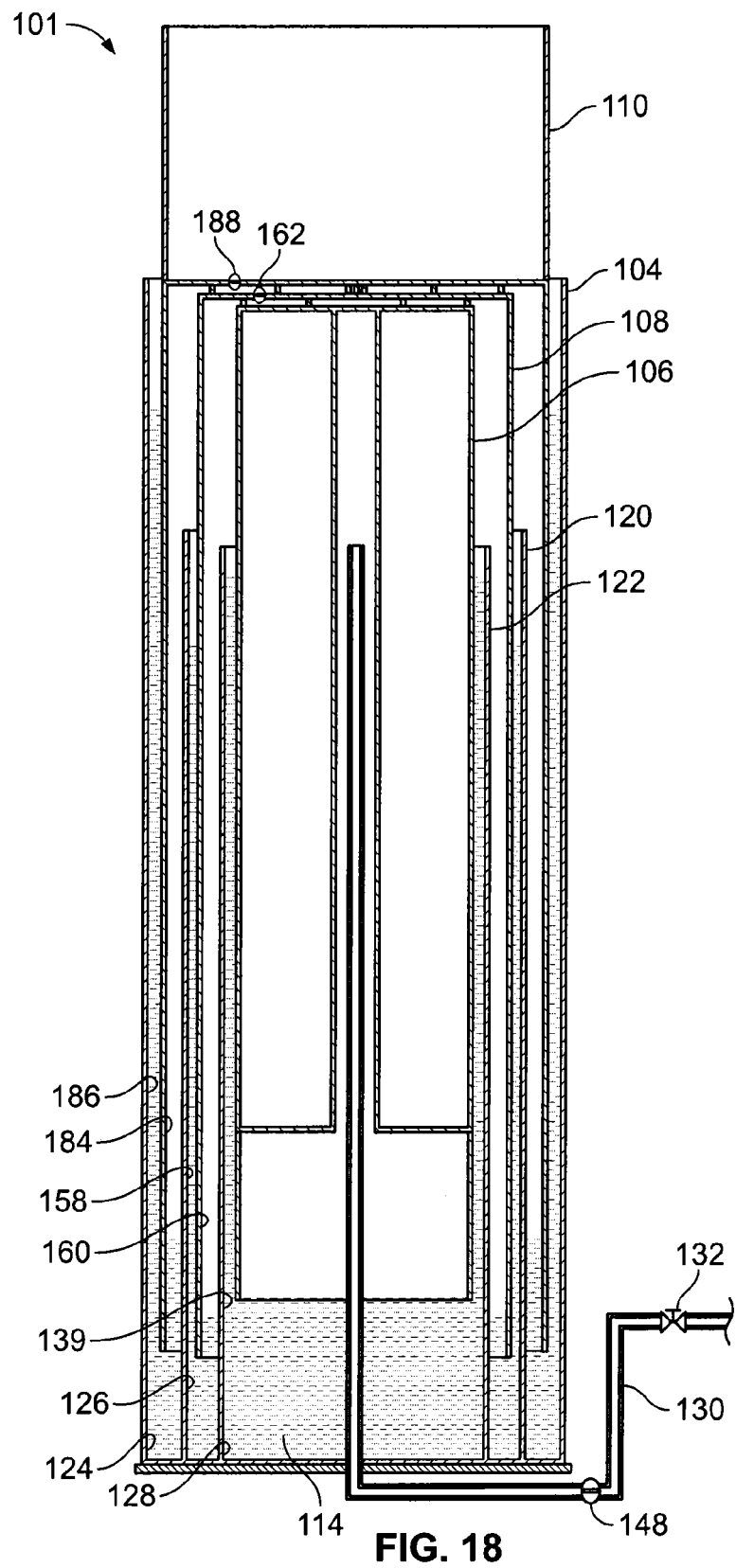
FIG. 18 is a cross-sectional view of the apparatus shown in FIG. 14 in a fully extended state.

The air is continuously injected throughout the pre-charge process. As best shown in FIGS. 16-18, when the displacement chamber 140 is completely or almost completely filled with air and substantially all of the liquid 114 inside it has been forced out, air bubbles begin to rise upwards in the annular gap 160 separating the pod 106 and the inner riser 108, due to the buoyancy of the air inside the liquid 114. The air bubbles are trapped in the open lower end 150 of the inner riser 108. This results in liquid 114 being pushed out of the open lower end 150 of the inner riser 108. The liquid 114 is forced to travel downwards through the annular gap 158 separating the inner ringwall 122 and the inner riser 108, because the pressure inside the displacement chamber 140 and the resulting pressures in the annular gap 160 separating the inner riser 108 and the inner ringwall 122 are higher than the pressure in the annular gap 158 separating the inner ringwall 122 and the inner riser 108. The liquid 114 flows similarly through the remaining compartments and ultimately is forced into the outer tank 104.

The liquid 114 is gradually pushed out of the inner riser 108 to the point when the annular gap 160 separating the inner ringwall 122 and the inner riser 108 is substantially full of pressurized air. Once the pressurized air column has reached the end of the wall 154 of the inner riser 108, air bubbles begin to rise upwards through the annular gap 158 separating the inner riser 108 and the outer ringwall 120. The air bubbles are trapped inside the open lower end 172 of the outer riser 110. The building air pressure forces liquid 114 out of the outer riser 110, which liquid 114 travels downwards through the annular gap 184 separating the outer riser 110 and the outer ringwall 120, and then upwards through the annular gap 186 separating the outer riser 110 and the tank wall 118. The process is continued until substantially all of the liquid 114 is forced out of the annular gap 184 separating the outer ringwall 120 and the outer riser 110.

Once the pressurized air column reaches the end of the wall 170 of the open lower end 172, bubbles begin to rise up the side of the outer riser 110 and inside the outer tank 104. The apparatus 100 is now pre-charged and ready to begin its upstroke. The air injection is discontinued. All that is needed to initiate and maintain the upstroke is to open the hydraulic shut-off valve 214 and allow the unit 101 to travel upwards.

Filling the displacement chamber 140 moves a volume of liquid 114—which in turn systematically moves the separated air and separated liquid 114 volumes between each outer ringwall 120, inner ringwall 122, and inner riser 108 and outer riser 110 to both create the "head" on one side and unequal pressures (converted to lift) on the inner riser 108 and outer riser 110 surfaces.

The pre-charge process results in alternating air and liquid columns (or head) being disposed within the annular gaps separating the pod 106 and the inner ringwall 122, the inner ringwall 122 and the inner riser 108, the inner riser 108 and the outer ringwall 120, the outer ringwall 120 and the outer riser 110, and the outer riser 110 and the tank wall 118. This functions to create alternating positive buoyancy and negative buoyancy. The outer ringwall 120, the inner ringwall 122, the inner riser 108, and the outer riser 110 combinations can be stacked to accumulate the effect of the initial pressure differential on multiple surfaces, resulting in a much greater lift without increasing input costs. The pressure increases as layers are added because of the head, the beneficial force that is applied per unit of surface area remains constant. As in a 12 foot liquid column (or head) will result in 5.2 lbs×the surface of the inner riser 108 or outer riser 110, and additional layer will increase the inner head to 10.4 but the consumable force within the inner will remain 5.2 lbs times the inner surface, because the next layer will have a opposite force of 5.2 lbs and then the second riser will benefit from the 5.2 lbs, which translates into multiplied lift. It is to be understood that the pod/ringwalls/risers combination is designed control two or more separate head pressures, it is the presence of head pressure that acts upon the internal surfaces and creates lift. Measuring from the outer riser 110 toward the inner riser 108, each head pressure is added to the next and so the air trapped between successive liquid columns is at a pressure greater than the last pressure, each volume of air captured between the liquid columns has a pressure directly related to the accumulations of the pressures of prior liquid columns.

The pressure in each column of air combines with the pressure of previous liquid columns and air columns. This increase in pressure is in direct relationship to the previous air column pressures plus the previous liquid column pressures.

As an example with a liquid column height of 12 feet, or 5.2 lbs psi, the pressure from one side to the other will net a 5.2 psi differential (with the greater pressure maintained on the inside of the system). One side may have 10.4 psi and the inside will have 15.6 resulting in the realized pressure of 5.2 psi. That continues throughout the unit 101, increasing with the addition of each head. The pressure is equal at all points and helps to force the ringwalls and risers away from each other, since the ringwalls are stronger than the force applied, the force acts to dynamically self-center the risers. The design of the apparatus 100 captures the potential between the unequal pressures. Thus a riser that may have 15 psi pushing down on it will have 20 psi pushing up, with the resulting force being an upward force of 5 psi for that individual surface.

When the lengths of the liquid columns are consistent by design, the pressure differentials will remain just as consistent and predictable. Since this transferred liquid column pressures are greater than the pressures on the opposite or top side of the inner riser 108, a measurable and predictable lift is generated.

The riser sizes, and thus surface areas, increase as the risers are overlapped, which increases the overall surface area to be affected by the pressure differential. The air volume up the side of the pod 106 is sized to be sufficient to fill the annular gap 160 between the inner ringwall 122 and inner riser 108, but as levels are added and pressures are increased additional volume can be compensated for by having each successive ringwall about two inches higher than the last. This will function compensate for gap air requirements, and allow for greater reduction of liquid column during sinking operations. The need for this is directly related to the number of risers and ringwalls added—a larger unit 101 with fewer layers is more efficient than a smaller unit 101 with more layers.

The design of the combination of the pod 106, outer ringwall 120 and inner ringwall 122, and inner riser 108 and outer riser 110 is to naturally sink, i.e. have at least neutral or slightly negative buoyancy, unless and until the displacement chamber 140 begins to receive air. In essence no work is done to sink the unit 101; work is only needed to make the unit 101 rise. The lift realized out of the pod 106 is proportional to the multiplied forces on the surfaces of the inner riser 108 and the outer riser 110. Because of the relative position to the liquid 114, the design basically makes the operation reversible at the cost of the pre-charge and then reverses charge. The air and liquid 114 in the system are moved back and fort by the differential air mass exchanger 102 as long as the pod 106 and inner riser 108 is allowed to rise when a predetermined lift is reached.

For the purposes of clarity of the foregoing description, the air expansion that occurs during rise was not considered. In reality, the succession of liquid column heights would be reduced at a cascading rate—one inch of loss per travel for the first head closest to the pod 106—two inches of loss per travel of the second head, three inches of loss for the fourth. The natural expansion of air of about 12% of the total volume of each air gap greatly reduces the cascading loss. The displacement chamber 140 is calculated to displace liquid 114 at a ratio of 14 inches to 1 inch of travel; each inch of air forced into the displacement chamber 140, not considering the pressure differences, would result in 14 inches of head. In actuality the initial pre-charge is used to compress the gap air, which in turn expands during rise. The differential pressure (lift pressure) is only affected by the total realized head loss. The air expansion only affects the lift at the point that head is actually lost. As successive ringwalls and risers are added, the air needed to fill the ringwall and riser would increase because of increased diameter. This can be compensated for by successively reducing the gap to keep the volume at pressure equal.

Reducing the gap can go to infinity, but there is a ratio of effective usage to size requirements. It is not feasible to add ringwalls and risers to infinity, so initially sizing the pod 106, the displacement chamber 140, the outer ringwall 120, the inner ringwall 122, and the inner riser 108 and outer riser 110, is a more efficient approach.

During descend of the unit 101, the air within the unit 101 remains pressurized. The input work performed is used to create liquid column height differentials; the work that is captured is a secondary effect of the initial input work. The apparatus 100 is designed to cheaply create liquid column height differentials and is operated at atmospheric pressure. The work lift that is captured through the surface area of the inner riser 108 and outer riser 110 is secondary, and is basically a free.

Reversing the process keeps the pressure nearly the same exiting the unit 101 as the pressure that was put in—which is why the exiting pressure can be utilized to help actuate the differential air mass exchanger 102. The work that was put in can now be output at nearly the same rate as the rate at which it was inputted. The stroke length reduces the input power by creating a greater differential; this loss is what must be overcome to cycle. This unique utilization of a secondary effect is what allows the apparatus 100 as disclosed herein to both utilize the exhaust to assist in actuating the differential air mass exchanger 102, and to control the decent of the outer riser 110, the inner riser 108, and the pod 106.

If the unit 101 were raised above the surface of the liquid 114, held in place and then the displacement chamber 140 were vented—the result would be like that of reversing the differential; a nearly equal downward force would be realized, the effective force would be as though the entire unit 101 full of liquid 114 were lifted out of the liquid 114. It would be as heavy as the lift was. Operating the apparatus 100 "normally" utilizes that force to keep the displacement air under pressure.

Please note that the configuration of liquid 114 and air found in the set up procedure is described for clarity only, and will not be achieved during cycling of the apparatus 100 (unless the hydraulic shut-off valve 214 is closed). During normal operations, once the minimum liquid column height differential is achieved to overcome the resistance caused by the hydraulic capture cylinder 210 pressure requirements, the unit 101 will begin to rise. The apparatus 100 operates at each increase of displacement at that same level of liquid column height differential. It is the liquid column height differential which translates to pressure, and it is that pressure that acts upon the surface areas of the pod 106 and inner riser 108 and outer riser 110 causing lift. The pre-charge initially raises the liquid level between each of the outer ringwall 120 and inner ringwall 122 and the inner riser 108 and outer riser 110, until the resultant liquid column height differential causes the lift needed to exceed the resistance of the hydraulic capture cylinder 210.

As the outer riser 110 begins to move, additional air input from the differential air mass exchanger 102 into the displacement chamber 140 maintains the liquid column height differential and lift. The outer riser 110 cannot move faster than the liquid column height differential is maintained. The travel of the unit 101 is calculated so that the minimum lift needed is maintained until the end of the stroke. As the outer riser 110 moves further away from the bottom 116 of the outer tank 104, or base of the inner ringwall 122, the space once occupied by air (which is the cause of the liquid column pressure) will backfill from the liquid 114 which had been pressed to the outside of the inner ringwall 122.

The pod 106 is allowed to rise at the same speed at which the air is injected; this action is controlled by sizing the hydraulic capture cylinder 210 (surface area) in relationship to both the pressure needed and the upward force captured. Full force is maintained for the duration of the stroke allowing the stroke cycle to create a condition with only a slight loss in lift when the rate of rise and input is matched. At the end of the stroke cycle when the apparatus 100 reaches its fully extended position, the processes is reversed, the pressurized air which displaced the liquid 114 during the pre-charge and stroke is then used to assist in the differential air mass exchanger 102.

The hydraulic capture cylinder 210 cannot rise until the inlet pressure of the hydraulic accumulator 212 has been exceeded. This creates an automatic control of both speed and power. The operation of the pod 106 is automatic—it reacts to the rise of liquid 114 around it; it is neutrally affected by the pressure at the top of the outer tank 104. Since the hydraulic capture system 112 is calculated to be set at the lowest force attainable during the stroke, the rise will occur as soon as that minimum force is reached; consequently the rise of the unit 101 will occur before pre-charge has been attained.

When using a two-unit apparatus 100, the valve 132 on the air conduit 130 of the unit 101*a* being submerged first is initially closed until the unit 101*a* is fully submerged and pre-charged, and the second unit 101*b* is in its fully extended position. Next, the previously closed valve 132 should be carefully opened to the differential air mass exchanger 102;

the pressure from inside the pod 106 will act upon the differential air mass exchanger 102 to move the cylinders 216 toward the unit 101b. Extreme caution should be exercised during this procedure.

Once the second unit 101b is safely positioned, the valve 132 near the outer tank 104b must be closed and the process starting with pre-charging the second unit 101b must be repeated. Once both outer tanks 104a and 104b are properly and equally charged, the hydraulic controls on the differential air mass exchanger 102 should be engaged to restrict movement. Both valves 132 should be reopened and locked in that position.

Next, the pressure from the fully extended unit 101b is routed into the differential air mass exchanger 102, which pressure acts to move the cylinders 216 inside the differential air mass exchanger 102 toward the adjacent and full cylinders 216. The air inside the full cylinders 216 is pressed into the raising system's displacement chamber 140; at the same time the differential air mass exchanger 102 is assisted by the hydraulic assist 218. The hydraulic assist 218 receives pressure from the hydraulic accumulator 212 and presses the actuator bar 220, the actuator bar 220 works through a fulcrum to apply additional pressure to the cylinders 216. The initial work of the hydraulic assist 218 is to overpower the counterbalance; once the halfway point is passed, both the counterweight 222 and the cylinder 216 work together.

The raising unit 101a simultaneously receives air into the displacement chamber 140 which initially charges the liquid column until the lift overcomes the set point, and then the production of pressurized hydraulic fluid is maintained until the end of the stroke. The production of pressurized hydraulic fluid may be controlled by check valves before the hydraulic accumulator 212. When the differential air mass exchanger 102 reaches the end of its travel, a mechanism switches the direction of the hydraulic assist 218. The production of pressurized hydraulic fluid is automatic, and in direct response to the disposition of the differential air mass exchanger 102. The system reverses continually at the end of each stroke. The down stroke of one unit 101a corresponds directly with the up stroke of the unit 101b. The cost associated with the system is the work performed by the hydraulic assist 218.

In an alternative embodiment, the outer riser 110 may be optionally attached to a six-foot (extended length) hydraulic capture cylinder 210 which may be mounted above the system on a reinforced truss, for example. This does little to stabilize the outer riser 110, but can act as a guide. The risers may each have a cap, those caps are gapped from each other by spacers, and the spacers keep the surface in a position to be acted upon by the liquid column pressure. A centering cone may be welded with a mating convex cone on each successive riser cap; this allows the risers to separate as needed but aligns them when mating/lift occurs. This gap acts to consume the volume of air inside each riser and results in the reduction of the remaining liquid column lowering its lift to below the weight of its inner riser 108. The outer riser 110 is connected to the hydraulic capture cylinder 210; its travel is limited by the truss support bracket and the outer ringwall 120 and inner ringwall 122. The structural integrity is designed to conform to the needs of the apparatus 100.

The air from the differential air mass exchanger 102 is injected into the displacement chamber 140 continuously until the calculated travel is reached. Once equilibrium is reached (the point at which enough liquid column is created to over power the resistance of the hydraulics)—which is referred to as "pre-charge"—the apparatus 100 is in tension between traveling out of equilibrium and receiving additional input to travel further. The differential air mass exchanger 102 first works to create the liquid column, and then works in conjunction with the pod 106 to maintain the liquid column needed to both travel and overcome the resistance. This design benefits from the liquid column which is generated by the moving of the liquid 114, and the buoyancy generated by the same action. Injecting the air displaces liquid 114 and moves liquid 114—both actions, though they sound the same, are utilized to create lift. No additional liquid column is created once equilibrium is reached because the unit 101 moves in direct relationship with the increase in liquid column height at that point. Air is added to gain liquid column while rising from that setup.

Due to the unique combination of the pod 106, the inner riser 108 and the outer riser 110, and the outer ringwall 120 and inner ringwall 122, during the upstroke the pod 106 takes up space so that the liquid column can exist cheaply, and the liquid column is maintained and raised out of the liquid during the upstroke. When the end of travel is reached on the upstroke the hydraulic assist 218 is reversed to apply power in the opposite direction, this allows the pressurized air in the pod 106 to escape into the differential air mass exchanger 102. When one inch depth of the air is evacuated from the displacement chamber 140 about 14 inches of liquid column would be lost if it were not now hung in the air; like an upside down cup pulled out of liquid—a vacuum now pulls down on each of the inner riser 108 and outer riser 110 surfaces each pushing down on the pod 106, exceeding the lift of the pod 106.

The refill rate of the hydraulic assist 218 is flow rated to match the speed of the differential air mass exchanger 102 in order not to over-speed the pod 106, which would cause the liquid 114 below the pod 106 to be blown over the inner ringwall 122.

Figure 19:
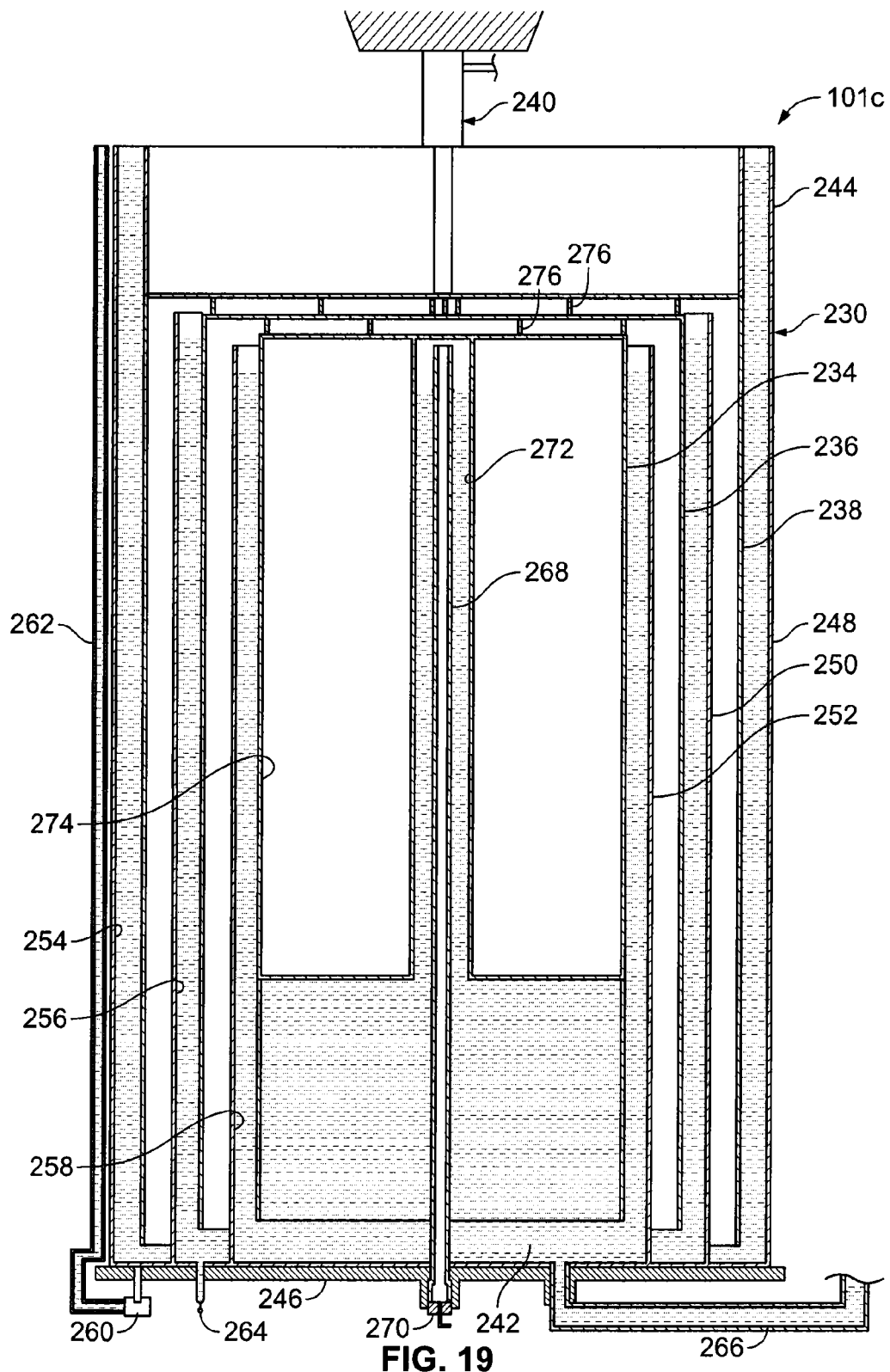
FIG. 19 is a cross-sectional view of an exemplary embodiment of an apparatus constructed according to the inventive concepts disclosed herein.

Referring now to FIG. 19, shown therein is an alternative embodiment of a unit 101c according to the present disclosure. The unit 101c may be implemented similarly to, or differently from the unit 101. The unit 101c comprises an outer tank 230 connected to a differential mass exchanger 232, a pod 234, an inner riser 236, an outer riser 238 connected to a hydraulic capture assembly 240. The outer tank 230 is at least partially filled with a liquid 242.

The outer tank 230 can be implemented similarly to the outer tank 104 and comprises an open top 244, a closed bottom 246, a tank wall 248, an outer ringwall 250, and an inner ringwall 252.

The outer ringwall 250 and the tank wall 248 define a first annular space 254, the outer ringwall 250 and the inner ringwall 252 define a second annular space 256, and the inner ringwall 252 defines a cylindrical space 258.

A liquid level indicator 260 extends through the bottom 246 and is in fluid communication with the first annular space 254. The liquid level indicator 260 is fluidly connected to a transparent tube 262 which extends along the outside of the tank wall 248 to provide a visual indication of the level of liquid inside the outer tank 230, for example.

An air nozzle 264 extends through the bottom 246 and into the second annular space 256. The air nozzle 264 may be fluidly connected with an air compressor (not shown) such that compressed air may be injected into the second annular space 256 as will be described below, for example.

A liquid conduit 266 extends through the bottom 246 and into the cylindrical space 258 and is fluidly connected to the differential mass exchanger 232, such that a volume of liquid 242 may be transferred from the outer tank 230 to the differential mass exchanger 232, and a volume of liquid 242 may be transferred from the differential mass exchanger 232 into the outer tank 230, for example.

An air conduit 268 extends through the bottom 246 into the cylindrical space 258, the air conduit 268 selectively openable and closeable with a valve 270, such that any air trapped inside the cylindrical space 258 may be vented via opening the valve 270, as will be described below.

The pod 234 may be implemented similarly to the pod 106 and is lowered into the cylindrical space 258 of the outer tank 230. A cylindrical recess 272 of the closed chamber 274 of the pod 234 is adapted to receive the air conduit 268 therein, such that the pod 234 rests or sets onto the air conduit 268, when the pod 234 is fully submerged into the outer tank 230.

The inner riser 236 may be implemented similarly to the inner riser 108, or differently therefrom. The inner riser 236 is at least partially positioned into the second annular space 256, and is sized such that the inner riser 236 rests or sets on top of the pod 234, when the inner riser 236 is fully submerged into the outer tank 230. Optional bumper pads 276 may be used to cushion the connection between the inner riser 236 and the pod 234.

The outer riser 238 may be implemented similarly to the outer riser 110, or differently therefrom. The outer riser 238 is at least partially disposed into the first annular space 254, and is sized such that the outer riser 238 sets or rests on the inner riser 236 when the outer riser 238 is fully submerged into the outer tank 230. The outer riser 238 is connected to the hydraulic capture assembly 240, such that the hydraulic capture assembly 240 generates a volume of pressurized hydraulic fluid and stores such pressurized hydraulic fluid into a hydraulic accumulator (not shown). The hydraulic capture assembly 240 may be implemented similarly to the hydraulic capture system 112 as described above, for example.

The outer riser 238, the inner riser 236, and the pod 234 are vertically movable relative to the outer tank 230, and may be implemented similarly to the outer riser 110, inner riser 108, and pod 106, respectively, as described above.

Figure 20:
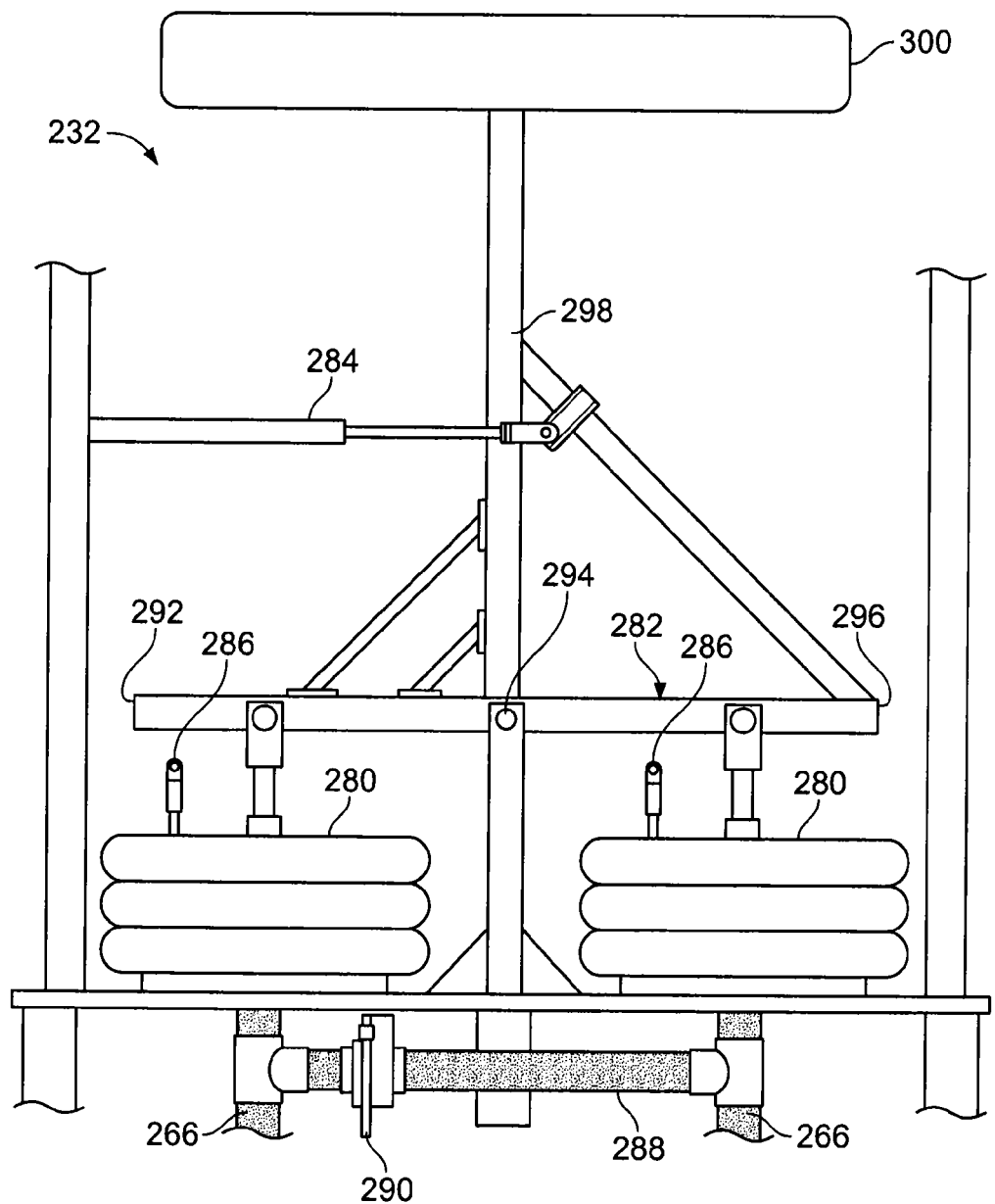
FIG. 20 is an elevational view of an exemplary embodiment of a mass exchanger according to the inventive concepts disclosed herein.

Referring now to FIG. 20 shown therein is an exemplary embodiment of a differential mass exchanger 232 according to the inventive concepts disclosed herein. The differential mass exchanger 232 comprises two or more convoluted bags 280, an actuator bar 282, and a hydraulic assist 284.

A first convoluted bag 280 is in fluid communication with a unit 101a, and a second convoluted bag 280 is in fluid communication with a unit 101b. The convoluted bags 280 are substantially filled with liquid 114, and function to transfer a volume of liquid 114 from the outer tank 104 into the convoluted bag 280, and from the convoluted bag 280 to the outer tank 104. The pressure of the liquid 114 inside the convoluted bags 280 may be measured via a transducer 286. The convoluted bag 280 is in fluid communication with the liquid conduit 266. Optionally, the convoluted bags 280 may be in fluid communication with one another via a conduit 288 which may be selective closed with a gate valve 290, for example.

Each of the two convoluted bags 280 are attached to an end of the actuator bar 282, such that when a convoluted bag 280 is filled with liquid 114 an end 292 of the actuator bar 282 is pressed upwards by the convoluted bag 280 about a pivot 294. At the same time, an opposite end 296 of the actuator bar 282 is pressed downward about the pivot 294 as a convoluted bag 280 deflates and forces and amount of liquid 114 into the second unit 101b. The actuator bar 282 may be constructed of any suitable material such as steel, metals, titanium, plastics, resins, wood, and combinations thereof, for example.

The actuator bar 282 is attached to a pendulum arm 298, such that the pendulum arm 298 moves about the pivot 294. The pendulum arm 298 may be constructed of any suitable material such as steel, metals, titanium, plastics, resins, wood, and combinations thereof, for example.

An optional counterweight 300 may be attached to the pendulum arm 298 and may be implemented similarly to the counterweight 222. The counterweight 300 may comprise a fluid-filled chamber (not shown). The counterweight 300 may be any suitable weight, such as lead ingots, steel plates, concrete blocks, liquid-filled compartments, and combinations thereof, for example.

The hydraulic assist 284 is connected to the pendulum arm 298, such that the hydraulic assist 284 is capable of applying force onto the pendulum arm 298 in order to actuate and control the movement of the pendulum arm 298 about the pivot 294. The hydraulic assist 284 may be in fluid communication with the hydraulic accumulator 212 and may be powered by pressurized hydraulic fluid supplied by the hydraulic accumulator 212.

The operation of the differential mass exchanger 232 is similar to the operation of the differential air mass exchanger 102, except that instead of moving air, the differential mass exchanger 232 moves a volume of liquid 114 between the tanks 104a and 104b and the convoluted bags 280.

It is to be understood that other shapes, materials, and sizes may be utilized for the various components of an apparatus 100 constructed in accordance with the inventive concepts disclosed herein, provided that such other shapes and sizes are capable of forming concentric formations that are capable of being stabilized by dynamic centering. It is to be further understood that other stabilizing means may be used with an apparatus 100 according to the inventive concepts disclosed herein, in combination with dynamic centering, or with each other.

From the above description, it is clear that the inventive concepts disclosed herein are adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope of the inventive concepts disclosed herein and defined by the appended claims.

What is claimed is:

1. An apparatus, comprising:
   an outer tank having an open top, a tank wall, and a closed bottom;
   a first ringwall extending to a first height from the bottom, the first ringwall spaced apart from the tank wall such that a first annular space is defined by the first ringwall and the tank wall, and a second annular space is defined by the first ringwall;
   a second ringwall extending to a second height from the bottom, and disposed in the second annular space defined by the first ringwall, such that a third annular space is defined by the first ringwall and the second ringwall, and a cylindrical space defined by the second ringwall;
   a cylindrical air conduit extending to a third height through the bottom and into the cylindrical space;
   a pod disposed at least partially into the cylindrical space, the pod comprising a closed top, a wall, and a bottom defining a closed gas-filled chamber having a cylindrical recess receiving the air conduit therein, the wall extending past the bottom to define an open displacement chamber, the wall separated from the second ringwall by a first annular gap; and an inner riser at least partially disposed in the third annular space, the inner riser having a closed top having upper and lower surfaces, a wall, and an open bottom, the lower surface of the inner riser resting on the inner ringwall, the wall separated from the inner ringwall by a second annular gap, and separated from the outer ringwall by a third annular gap;

an outer riser at least partially disposed in the first annular space and having a closed top, a wall, and an open bottom, the closed top resting on the outer ringwall and onto the inner riser, the wall separated from the outer ringwall by a fourth annular gap, and separated from the tank wall by a fifth annular gap, wherein the outer tank is at least partially filled with a liquid, and wherein the first annual gap, the third annual gap, and the fifth annual gap are substantially full of the liquid, and the displacement chamber, the second annual gap, and the fourth annual gap are substantially free of the liquid, such that the pod, inner riser, and outer riser are positively buoyant and capable of traveling upward relative to the outer tank.

2. The apparatus of claim 1, further comprising a hydraulic capture cylinder containing a volume of hydraulic fluid therein connected to the outer riser, such that the hydraulic capture cylinder is capable of being actuated by the upward travel of the outer riser, the hydraulic capture cylinder in fluid communication with a hydraulic accumulator, such that a volume of hydraulic fluid is movable into the hydraulic accumulator by the hydraulic capture cylinder.

3. The apparatus of claim 2, wherein the hydraulic capture cylinder is in fluid communication with a shut-off valve capable of selectively preventing the outer riser from traveling upwards.

4. An apparatus, comprising:
a first unit comprising:
   an outer tank having an open top, a tank wall, and a closed bottom;
   a first ringwall extending to a first height from the bottom, the first ringwall spaced apart from the tank wall such that a first annular space is defined by the first ringwall and the tank wall, and a second annular space is defined by the first ringwall;
   a second ringwall extending to a second height from the bottom, and disposed in the second annular space defined by the first ringwall, such that a third annular space is defined by the first ringwall and the second ringwall, and a cylindrical space defined by the second ringwall;
   a cylindrical air conduit extending to a third height through the bottom and into the cylindrical space;
   a pod disposed at least partially into the cylindrical space, the pod comprising a closed top, a wall, and a bottom defining a closed gas-filled chamber having a cylindrical recess receiving the air conduit therein, the wall extending past the bottom to define an open displacement chamber, the wall separated from the second ringwall by a first annular gap;
   an inner riser at least partially disposed in the third annular space, the inner riser having a closed top having upper and lower surfaces, a wall, and an open bottom, the lower surface of the inner riser resting on the inner ringwall, the wall separated from the inner ringwall by a second annular gap, and separated from the outer ringwall by a third annular gap; and
   an outer riser at least partially disposed into the first annular space and having a closed top, a wall, and an open bottom, the closed top resting on the outer ringwall and onto the inner riser, the wall separated from the outer ringwall by a fourth annular gap, and separated from the tank wall by a fifth annular gap,
   wherein the outer tank is at least partially filled with a liquid, and wherein the first annual gap, the third annual gap, and the fifth annual gap are substantially full of the liquid, and the displacement chamber, the second annual gap, and the fourth annual gap are substantially free of the liquid, such that the pod, inner riser, and outer riser are positively buoyant and capable of traveling upward relative to the outer tank;
a second unit comprising:
   an outer tank having an open top, a tank wall, and a closed bottom;
   a first ringwall extending to a first height from the bottom, the first ringwall spaced apart from the tank wall such that a first annular space is defined by the first ringwall and the tank wall, and a second annular space is defined by the first ringwall;
   a second ringwall extending to a second height from the bottom, and disposed in the second annular space defined by the first ringwall, such that a third annular space is defined by the first ringwall and the second ringwall, and a cylindrical space defined by the second ringwall;
   a cylindrical air conduit extending to a third height through the bottom and into the cylindrical space;
   a pod disposed at least partially into the cylindrical space, the pod comprising a closed top, a wall, and a bottom defining a closed gas-filled chamber having a cylindrical recess receiving the air conduit therein, the wall extending past the bottom to define an open displacement chamber, the wall separated from the second ringwall by a first annular gap;
   an inner riser at least partially disposed in the third annular space, the inner riser having a closed top having upper and lower surfaces, a wall, and an open bottom, the lower surface of the inner riser resting onto the inner ringwall, the wall separated from the inner ringwall by a second annular gap, and separated from the outer ringwall by a third annular gap; and
   an outer riser at least partially disposed in the first annular space and having a closed top, a wall, and an open bottom, the closed top resting onto the outer ringwall and on the inner riser, the wall separated from the outer ringwall by a fourth annular gap, and separated from the tank wall by a fifth annular gap,
   wherein the outer tank is at least partially filled with a liquid, and wherein the first annual gap, the third annual gap, and the fifth annual gap are substantially full of the liquid, and the displacement chamber, the second annual gap, and the fourth annual gap are substantially free of the liquid, such that the pod, inner riser, and outer riser are positively buoyant and capable of traveling upward relative to the outer tank; and
the air mass exchanger comprising an assist cylinder separating volumes of air of equal sizes on two sides thereof, and in fluid communication with the air conduit of the first unit and the air conduit of the second unit, the assist cylinder capable of moving the volumes of air between the first unit and the second unit.

5. The apparatus of claim 4, wherein the first unit further comprises a first hydraulic capture cylinder containing a volume of hydraulic fluid therein connected to the outer riser of the first unit such that the first hydraulic capture cylinder is capable of being actuated by the upward travel of the outer riser, the first hydraulic capture cylinder in fluid communication with a hydraulic accumulator such that a volume of hydraulic fluid is movable into the hydraulic accumulator by the first hydraulic capture cylinder.

6. The apparatus of claim 5, wherein the second unit further comprises a second hydraulic capture cylinder containing a volume of hydraulic fluid therein connected to the outer riser of the second unit, such that the second hydraulic capture cylinder is capable of being actuated by the upward travel of the outer riser, the second hydraulic capture cylinder in fluid communication with the hydraulic accumulator, such that a volume of hydraulic fluid is movable into the hydraulic accumulator by the second hydraulic capture cylinder.

* * * * *

UNITED STATES PATENT AND TRADEMARK OFFICE
CERTIFICATE OF CORRECTION

PATENT NO.        : 8,887,497 B2
APPLICATION NO.   : 13/292954
DATED             : November 18, 2014
INVENTOR(S)       : Wayne S. Travis It is certified that error appears in the above-identified patent and that said Letters Patent is hereby corrected as shown below:

In the Claims:
Column 21, line 4: After "resting on the" delete "inner" and replace with -- second --
Column 21, line 5: After "from the" delete "inner" and replace with -- second --
Column 21, line 6: After "from the" delete "outer" and replace with -- first --
Column 21, line 10: After "on the" delete "outer" and replace with -- first --
Column 21, line 11: After "from the" delete "outer" and replace with -- first --
Column 21, line 15: After "first" delete "annual" and replace with -- annular --
Column 21, line 15: After "third" delete "annual" and replace with -- annular --
Column 21, line 16: After "fifth" delete "annual" and replace with -- annular --
Column 21, line 17: After "second" delete "annual" and replace with -- annular --
Column 21, line 18: After "fourth" delete "annual" and replace with -- annular --
Column 21, line 62: Before "ringwall," delete "inner" and replace with -- second --
Column 21, line 62: At the end of the line, delete "inner" and replace with -- second --
Column 21, line 64: Before "ringwall," delete "outer" and replace with -- first --
Column 21, line 67: Delete "outer" and replace with -- first --
Column 22, line 2: Delete "outer" and replace with -- first --
Column 22, line 5: Delete "annual" and replace with -- annular --
Column 22, line 6: Before "gap," delete "annual" and replace with -- annular --
Column 22, line 6: After "fifth" delete "annual" and replace with -- annular --
Column 22, line 8: After "second" delete "annual" and replace with -- annular --
Column 22, line 8: After "fourth" delete "annual" and replace with -- annular --
Column 22, line 39: Delete "inner" and replace with -- second --
Column 22, line 40: Delete "inner" and replace with -- second --
Column 22, line 41: Delete "outer" and replace with -- first --
Column 22, line 44: Delete "outer" and replace with -- first --
Column 22, line 46: Delete "outer" and replace with -- first --
Column 22, line 49: Delete "annual" and replace with -- annular --
Column 22, line 50: Delete "annual" and replace with -- annular --

Signed and Sealed this
Twenty-fifth Day of August, 2015

Michelle K. Lee
*Director of the United States Patent and Trademark Office*

CERTIFICATE OF CORRECTION (continued)
U.S. Pat. No. 8,887,497 B2

Column 22, line 50: After "fifth" delete "annual" and replace with -- annular --
Column 22, line 52: After "second" delete "annual" and replace with -- annular --
Column 22, line 52: After "fourth" delete "annual" and replace with -- annular --
Column 22, line 57: Before "air mass exchanger" delete "the" and replace with -- an --